United States Patent
Shin et al.

(10) Patent No.: US 10,371,972 B2
(45) Date of Patent: Aug. 6, 2019

(54) DISPLAY APPARATUS

(71) Applicant: SAMSUNG ELECTRONICS CO., LTD., Suwon-si (KR)

(72) Inventors: Jung Ho Shin, Yongin-si (KR); Heong Seog Lee, Hwaseong-si (KR); Jai-Ho Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/191,805

(22) Filed: Jun. 24, 2016

(65) Prior Publication Data

US 2016/0377908 A1    Dec. 29, 2016

(30) Foreign Application Priority Data

Jun. 26, 2015 (KR) .................. 10-2015-0091238

(51) Int. Cl.
*G02F 1/1333* (2006.01)
(52) U.S. Cl.
CPC ............. *G02F 1/133308* (2013.01); *G02F 2001/133314* (2013.01); *G02F 2001/133317* (2013.01); *G02F 2001/133325* (2013.01); *G02F 2001/133328* (2013.01); *G02F 2201/465* (2013.01)
(58) Field of Classification Search
CPC .............................................. G02F 1/133308
See application file for complete search history.

(56) References Cited

U.S. PATENT DOCUMENTS

| | | | | |
|---|---|---|---|---|
| 2001/0036057 | A1* | 11/2001 | Fukuyoshi | G02F 1/133308 361/679.26 |
| 2005/0259191 | A1* | 11/2005 | Park | G02F 1/133308 349/58 |
| 2007/0273809 | A1 | 11/2007 | Lee | |
| 2008/0284939 | A1 | 11/2008 | Lee et al. | |
| 2009/0141198 | A1 | 1/2009 | Kim | |
| 2009/0201441 | A1* | 8/2009 | Laney | G02F 1/133308 349/64 |

(Continued)

FOREIGN PATENT DOCUMENTS

| | | |
|---|---|---|
| JP | 2011-253769 A | 12/2011 |
| KR | 10-0806806 B1 | 2/2008 |
| KR | 10-1333267 B1 | 11/2013 |

OTHER PUBLICATIONS

International Search Report (PCT/ISA/210) dated Sep. 30, 2016 issued by the International Searching Authority in counterpart International Application No. PCT/KR2016/006676.

(Continued)

*Primary Examiner* — Edmond C Lau
(74) *Attorney, Agent, or Firm* — Sughrue Mion, PLLC

(57) ABSTRACT

Disclosed herein is a display apparatus including a liquid crystal panel configured to display an image; a backlight unit including: a light source; and an optical member disposed at a path of light emitted from the light source toward the liquid crystal panel; a chassis disposed on the backlight unit and having a plurality of insertion holes along edges thereof; and a frame configured to support the liquid crystal panel and the optical member, the liquid crystal panel and the optical member provided between the frame and the chassis, wherein the frame is coupled to the plurality of insertion holes of the chassis by fitting.

16 Claims, 20 Drawing Sheets

(56) References Cited

U.S. PATENT DOCUMENTS

| | | | |
|---|---|---|---|
| 2010/0014015 A1* | 1/2010 | Ho | G02F 1/133605 |
| | | | 349/58 |
| 2012/0014094 A1 | 1/2012 | Yu | |
| 2012/0162880 A1 | 6/2012 | Yoon et al. | |
| 2013/0063681 A1 | 3/2013 | Zhou | |
| 2014/0022488 A1 | 1/2014 | Yu et al. | |
| 2015/0077532 A1* | 3/2015 | Priest | G06F 1/1601 |
| | | | 348/77 |
| 2016/0186944 A1* | 6/2016 | Park | G09F 13/00 |
| | | | 362/97.1 |

OTHER PUBLICATIONS

Communication dated Jan. 19, 2018, from the European Patent Office in counterpart European Application No. 16814699.1.
Communication dated Oct. 26, 2018, issued by the European Patent Office in counterpart European Application No. 16814699.1.

* cited by examiner

DISPLAY APPARATUS

CROSS-REFERENCE TO RELATED APPLICATION

This application claims priority from Korean Patent Application No. 10-2015-0091238, filed on Jun. 26, 2015 in the Korean Intellectual Property Office, the disclosure of which is incorporated herein by reference in its entirety.

BACKGROUND

1. Field

Exemplary embodiments of the present disclosure relate to a display apparatus having improved assembling efficiency and having high reliability by improving properties of a material used to form a frame that supports a liquid crystal panel and an optical member.

2. Description of the Related Art

Display apparatuses are output devices to visually display data information such as texts, figures and images and the display apparatuses include, for example, TVs, monitors, notebook computers, table PCs, smart phones and other various mobile terminals.

Display apparatuses may be classified into emissive display apparatuses using a self-emitting display panel, such as an organic light emitting diode (OLED) display, and non-emissive display apparatuses using a display panel receiving light from a backlight unit, such as a liquid crystal display (LCD).

The backlight unit may include a light source and various optical members. Examples of the light source may be a cold cathode fluorescent lamp (CCFL), an external electrode fluorescent lamp (EEFL), or a light emitting diode (LED) that is an eco-friendly device.

The optical member may include, for example, a light guide plate, a diffuser plate, a reflector sheet, a diffuser sheet, a prism sheet, and a dual brightness enhancement film (DBEF) sheet, which are appropriately arranged in accordance with a position of the light source.

The display apparatuses may include a chassis to accommodate a liquid crystal panel and a middle frame accommodated in the chassis to support the liquid crystal panel.

The chassis includes a bottom chassis arranged behind the backlight unit as a basic element and may optionally include a top chassis including a bezel part that covers edges of the front surface of the liquid crystal panel. The middle frame may support the liquid crystal panel and various optical members.

In the related art, the middle frame includes a middle frame body formed of a plastic material such as acrylonitrile butadiene styrene (ABS), a glass fiber, or a metallic material, and an adhesive member formed as a silicon rubber tape adhering to one surface of the middle frame body to prevent movement of the liquid crystal panel. The adhesive member may reduce dust generated in the middle frame body by friction between the middle frame body and the optical members, the liquid crystal panel, or the chassis while the display apparatus is assembled or transported. However, because the middle frame is assembled by adhering various parts formed of different materials together, an assembling process is complicated.

SUMMARY

One or more exemplary embodiments provide a display apparatus efficiently assembled by employing a middle frame integrally formed as one piece using a single material instead of being assembled with parts formed of different materials.

The display apparatus may be easily assembled by employing a middle frame easily coupled to and decoupled from a chassis.

The display apparatus may be less damaged while the display apparatus is assembled, transported, and stored by improving durability of a middle frame.

Additional aspects of the disclosure will be set forth in part in the description which follows and, in part, will be obvious from the description, or may be learned by practice of the disclosure.

In accordance with an aspect of an exemplary embodiment, a display apparatus includes a liquid crystal panel configured to display an image, a backlight unit including a light source and an optical member disposed at a path of light emitted from the light source, a bottom chassis disposed behind the backlight unit and having a plurality of insertion holes at edges thereof and a frame configured to support the liquid crystal panel and the optical member and coupled to the plurality of insertion holes of the bottom chassis by fitting.

The frame may be formed of a thermoplastic rubber material.

The insertion holes may be formed in a bush part protruding backward from edges of the bottom chassis.

The frame may include an insertion protrusion part protruding to be coupled to the insertion hole of the bottom chassis by fitting.

The insertion protrusion part may include an insertion body part having a dimension greater than that of the insertion hole.

The insertion protrusion part may include a guide part tapered to guide the insertion body part to the insertion hole.

The frame may include a pair of longer side frames and a pair of shorter side frames.

The display apparatus may include a reinforcement member coupled to the longer side frames and the shorter side frames to support the frame.

The display apparatus may further include a rear cover coupled to the rear of the bottom chassis and a circuit board disposed between the bottom chassis and the rear cover to control driving of the display apparatus.

In accordance with an aspect of another exemplary embodiment, a display apparatus includes a liquid crystal panel configured to display an image, a backlight unit including a light source and an optical member disposed at a path of light emitted from the light source, a bottom chassis configured to accommodate the backlight unit, a frame having a rectangular shape to support the liquid crystal panel and the optical member; and a reinforcement member configured to support at least one portion of the frame.

The reinforcement member may be disposed at a corner of the bottom chassis to support the frame.

The reinforcement member may be coupled to the bottom chassis.

A locking hole to be coupled to the reinforcement member may be formed at an edge of the bottom chassis.

The reinforcement member may include a hook protrusion part protruding backward to be coupled to the locking hole formed at the bottom chassis by a hook connection.

The reinforcement member may include a central part and a plurality of arm parts extending from the central part to be perpendicular to each other.

Longer side frames and shorter side frames of the frame may be coupled to the reinforcement member.

The central part of the reinforcement member may include a connection protrusion to be coupled to the longer side frames and the shorter side frames.

The reinforcement member may include a liquid crystal panel reinforcement support surface to support a side surface of the liquid crystal panel.

An interval between the liquid crystal panel reinforcement support surface of the reinforcement member and the side surface of the liquid crystal panel may be less than an interval between a liquid crystal panel support surface of the frame and the side surface of the liquid crystal panel.

In accordance with an aspect of another exemplary embodiment, a display apparatus includes: a liquid crystal panel configured to display an image; a backlight unit including: a light source; and an optical member disposed at a path of light emitted from the light source toward the liquid crystal panel; a chassis disposed on the backlight unit and having a plurality of insertion holes along edges thereof; and a frame configured to support the liquid crystal panel and the optical member, the liquid crystal panel and the optical member provided between the frame and the chassis, wherein the frame is coupled to the plurality of insertion holes of the chassis by fitting.

The frame may be formed of a thermoplastic rubber material.

The chassis may further include a bush part protruding backward from edges of the chassis, the bush part forming the plurality of holes.

The frame may include an insertion protrusion part protruding from the frame to be coupled to an insertion hole amongst the plurality of insertion holes of the chassis.

The insertion protrusion part may include an insertion body part, a dimension of the insertion body part being greater than a corresponding dimension of the insertion hole.

The insertion protrusion part may include a guide part having a tapered shape to guide the insertion body part into the insertion hole.

The frame may include a pair of first side frames and a pair of second side frames, a length of the first side frames being greater than a length of the second side frames.

The display apparatus may further include a reinforcement member coupled to one of the first side frames and one of the second side frames to support the frame.

The display apparatus may further include: a rear cover coupled to the chassis; and a circuit board disposed between the chassis and the rear cover and configured to control driving of the display apparatus.

In accordance with an aspect of another exemplary embodiment, a display apparatus includes: a liquid crystal panel configured to display an image; a backlight unit including: a light source; and an optical member disposed at a path of light emitted from the light source; a chassis configured to accommodate the backlight unit; a frame having a rectangular shape and supporting the liquid crystal panel and the optical member; and a reinforcement member configured to support at least one portion of the frame supporting the liquid crystal panel and the optical member.

The reinforcement member may be disposed at a corner portion of the chassis to support the frame.

The reinforcement member may be coupled to the chassis, the chassis provided between a rear cover and the backlight unit.

The chassis may include a locking hole provided at an edge of the chassis to be coupled to the reinforcement member.

The reinforcement member may include a hook protrusion part protruding toward the rear cover to be coupled to the locking hole of the chassis by a hook connection.

The reinforcement member may include: a central part; and a plurality of arm parts extending from the central part to be substantially perpendicular to each other.

The frame may include: first side frames; and second side frames, and wherein the first and the second side frames are coupled to the reinforcement member.

The central part of the reinforcement member may include a connection protrusion to be coupled to one of the first side frames and one of the second side frames.

The reinforcement member may include a liquid crystal panel reinforcement support surface to support a side surface of the liquid crystal panel.

An interval between the liquid crystal panel reinforcement support surface of the reinforcement member and the side surface of the liquid crystal panel is less than an interval between a liquid crystal panel support surface of the frame and the side surface of the liquid crystal panel.

In accordance with an aspect of another exemplary embodiment, a display apparatus includes: a liquid crystal panel configured to display an image; a backlight unit including: a light source; and an optical member, the liquid crystal panel provided on a first surface of the backlight unit; a chassis provided on a second surface opposite to the first surface of the backlight unit and having a plurality of insertion holes along edges thereof; and a frame provided on a backlight unit, the liquid crystal panel and the optical member provided between the frame and the chassis, wherein one of the frame and the chassis includes a male part and the other of the frame and the chassis includes a female part, and wherein the frame and the chassis are coupled to each other via the male part and the female part.

In accordance with an aspect of another exemplary embodiment, a display apparatus includes: a liquid crystal panel configured to display an image; a backlight unit including: a light source; and an optical member, the liquid crystal panel disposed on a first surface of the backlight unit; a chassis disposed on a second surface opposite to the first surface of the backlight unit and having a plurality of insertion holes along edges thereof; and a frame provided on a backlight unit, the liquid crystal panel and the optical member provided between the frame and the chassis, wherein the frame includes a reinforcement member configured to support at least one portion of the frame supporting the liquid crystal panel and the optical member, wherein one of the reinforcement member and the chassis includes a male part and the other of the reinforcement member and the chassis includes a female part, and wherein the reinforcement member and the chassis are coupled to each other via the male part and the female part.

BRIEF DESCRIPTION OF THE DRAWINGS

The above and/or other aspects of the disclosure will become apparent and more readily appreciated from the following description of the exemplary embodiments, taken in conjunction with the accompanying drawings of which.

DETAILED DESCRIPTION

Figure 1:
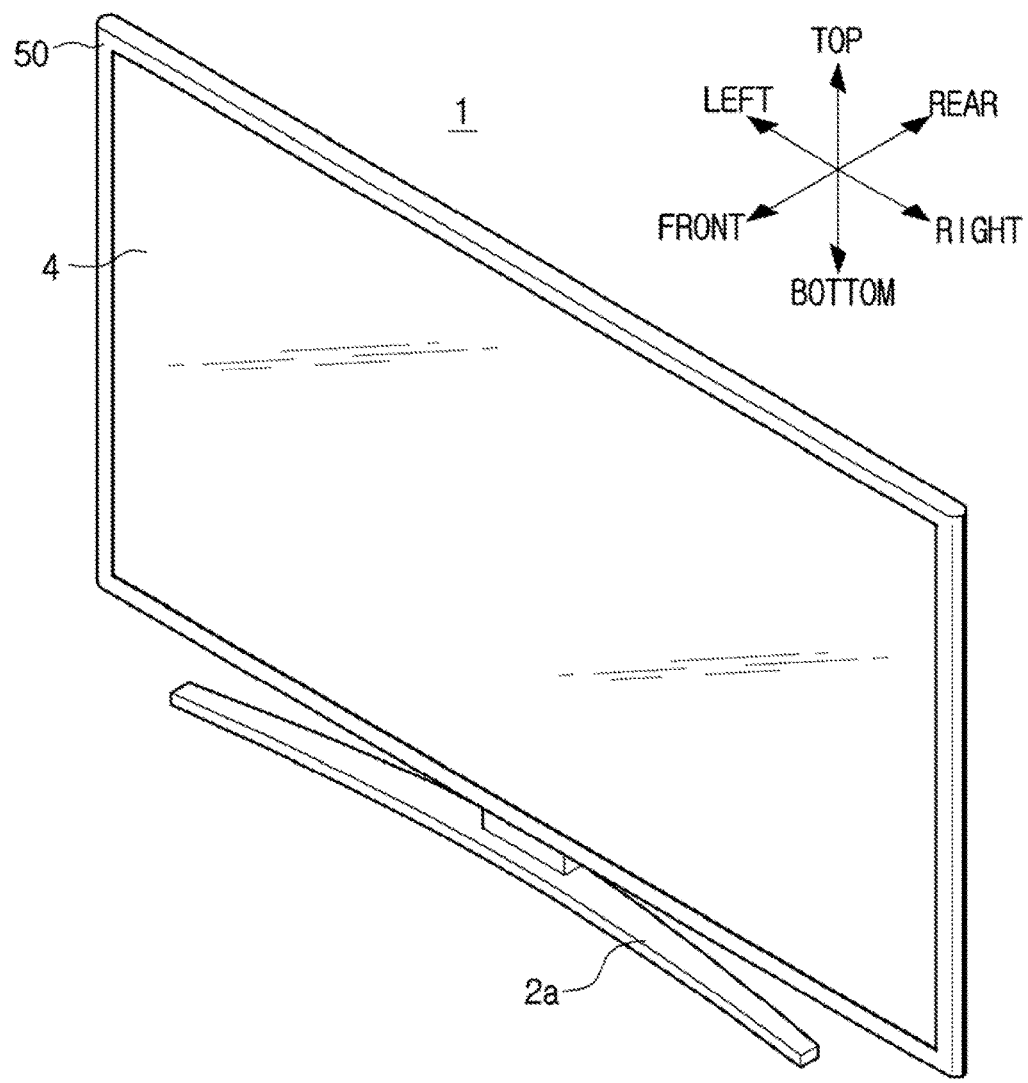
FIG. 1 is a perspective view illustrating a display apparatus according to an exemplary embodiment.

Reference will now be made in detail to exemplary embodiments of the present disclosure, examples of which are illustrated in the accompanying drawings.

The exemplary embodiments described in the specification and shown in the drawings are only illustrative and are not intended to represent all aspects of the invention, such that various equivalents and modifications may be made without departing from the spirit of the inventive concept.

Like reference numerals denote like elements. In the drawings, elements may be enlarged or exaggerated for clarity.

Unless expressly described otherwise, all terms including descriptive or technical terms used herein should be construed as having meanings that are obvious to one of ordinary skill in the art.

It should be understood that the terms used in the specification and appended claims should not be construed as limited to general and dictionary meanings but should be construed based on the meanings and concepts according to the spirit of the inventive concept on the basis of the principle that the inventor is permitted to define appropriate terms for best explanation.

It will be understood that, although the terms "first", "second", etc., may be used herein to describe various elements, these elements should not be limited by these terms. The above terms are used only to distinguish one component from another.

Throughout the specification, a singular form may include plural forms, unless there is a particular description contrary thereto.

In the present specification, it is to be understood that the terms such as "including" or "having," etc., are intended to indicate the existence of the components, features, numbers, steps, operations, or combinations thereof disclosed in the specification, and are not intended to preclude the possibility that one or more other components, features, numbers, steps, operations, or combinations thereof may exist or may be added.

Throughout the specification, the terms indicating directions such as "front", "rear", "upper", "lower", "left", and "right" are consistently used based on directions illustrated in FIG. 1.

The terms "front surface" and "rear surface" literally indicate "front surface" and "rear surface", and the term "side surface" may indicate all or any one of "top surface", "bottom surface", "left side surface", and "right side surface" depending on situations.

It will be understood that if one element is located "in front of", "behind, "on", "under", "on the left of" or "on the right of" another element, it can be directly or indirectly located "in front of", "behind, "on", "under", "on the left of" or "on the right of" the element. That is, a third intervening element may be present therebetween.

Figure 2:
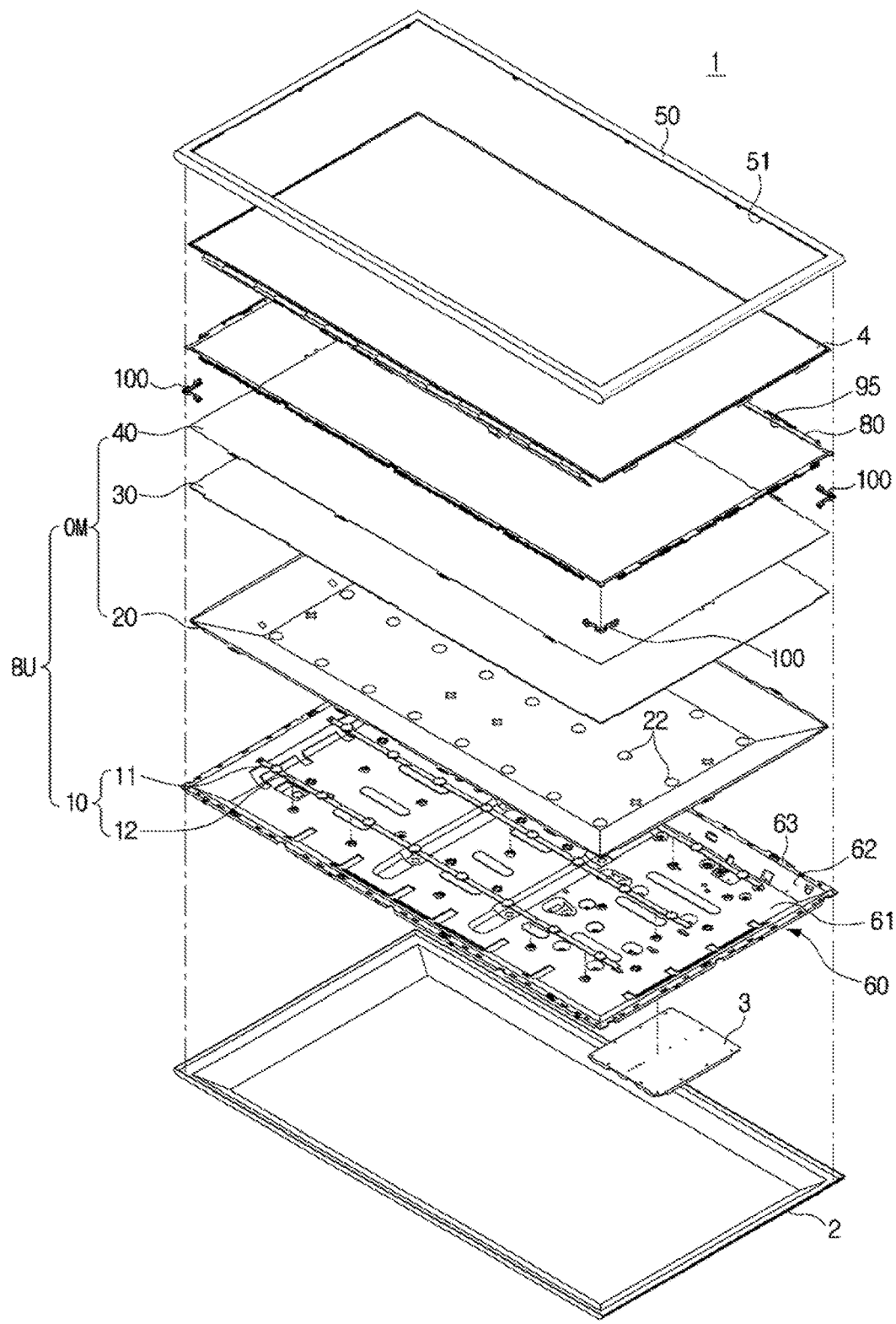
FIG. 2 is an exploded view illustrating components of the display apparatus of FIG. 1.
Figure 3:
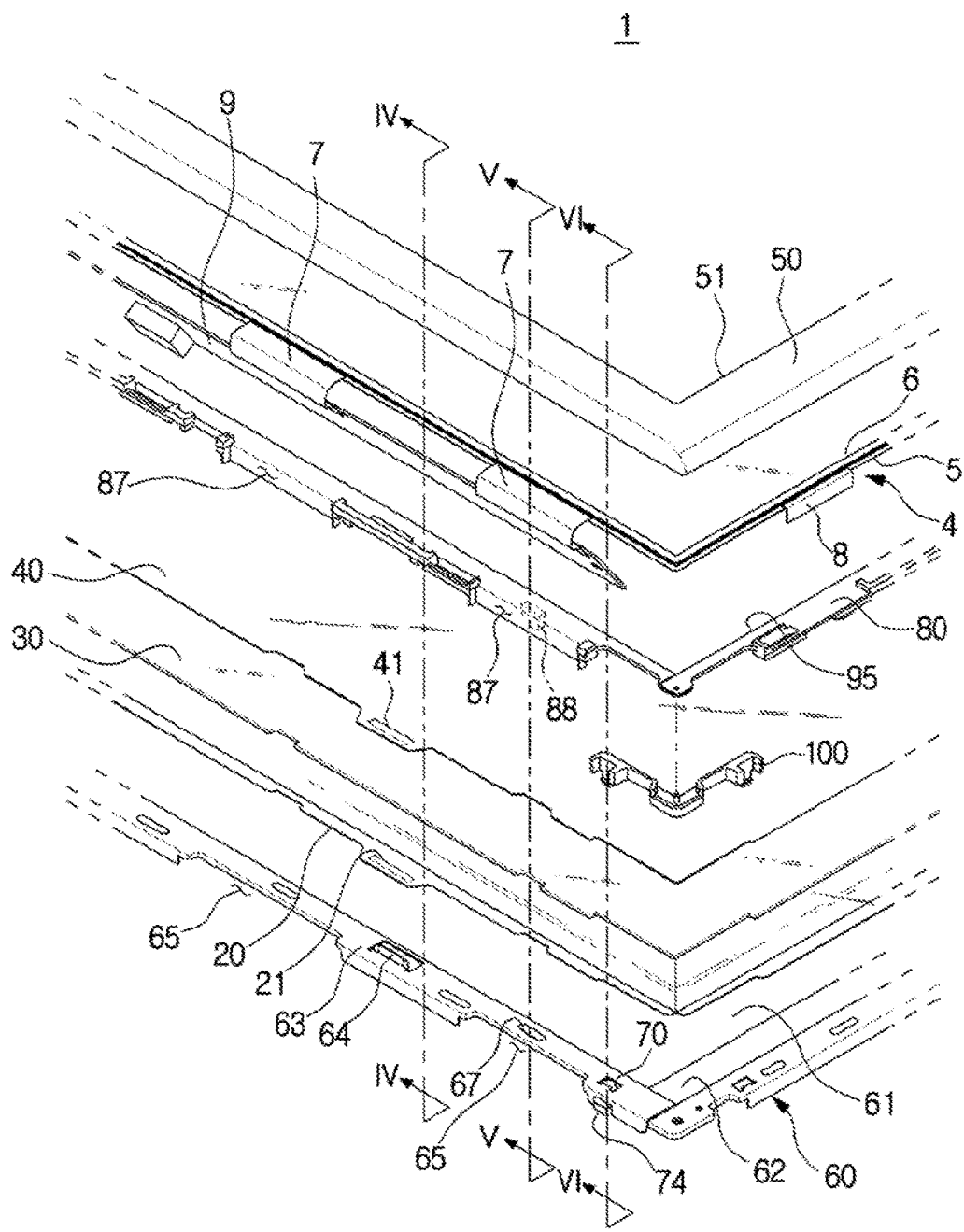
FIG. 3 is a view illustrating an enlarged portion of FIG. 2.
Figure 4:
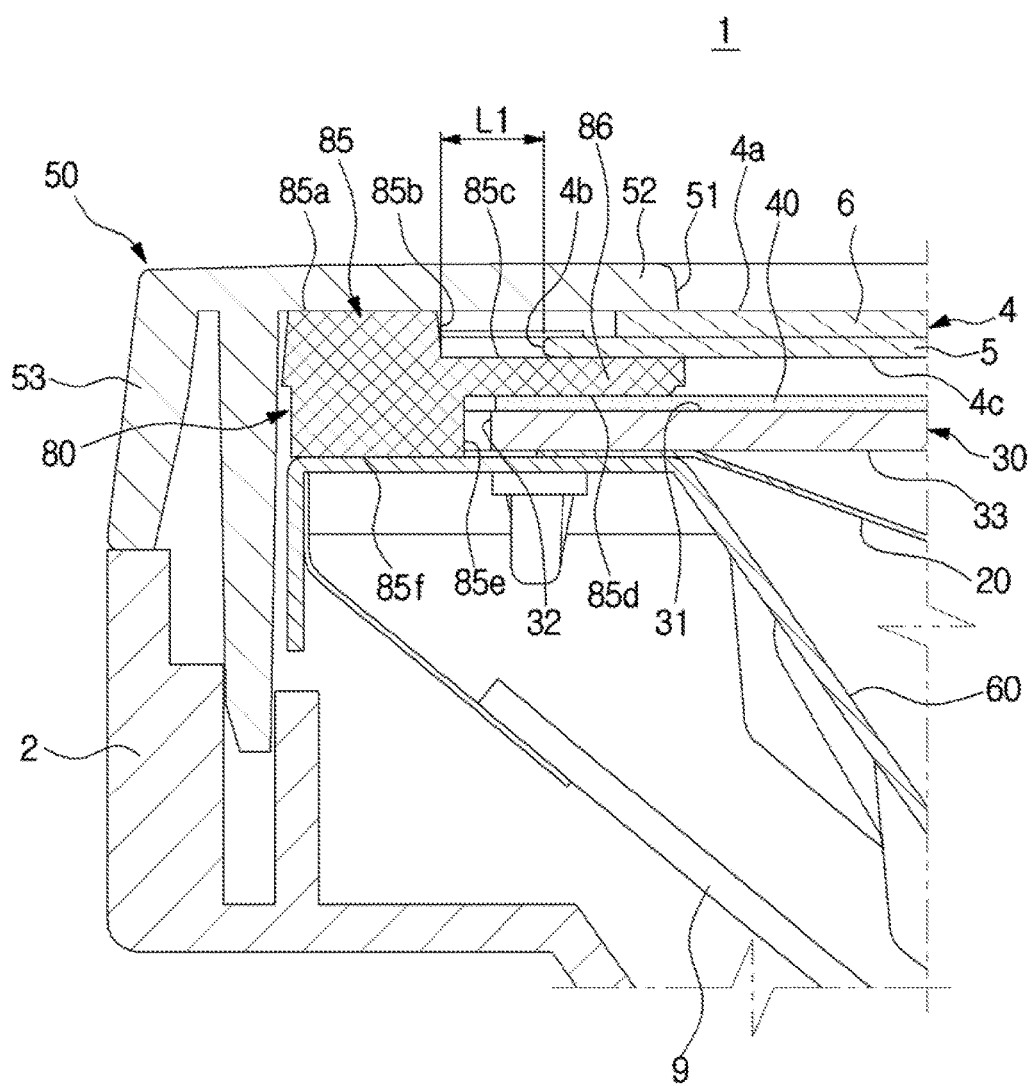
FIG. 4 is a cross-sectional view taken along line IV-IV of FIG. 3.
Figure 5:
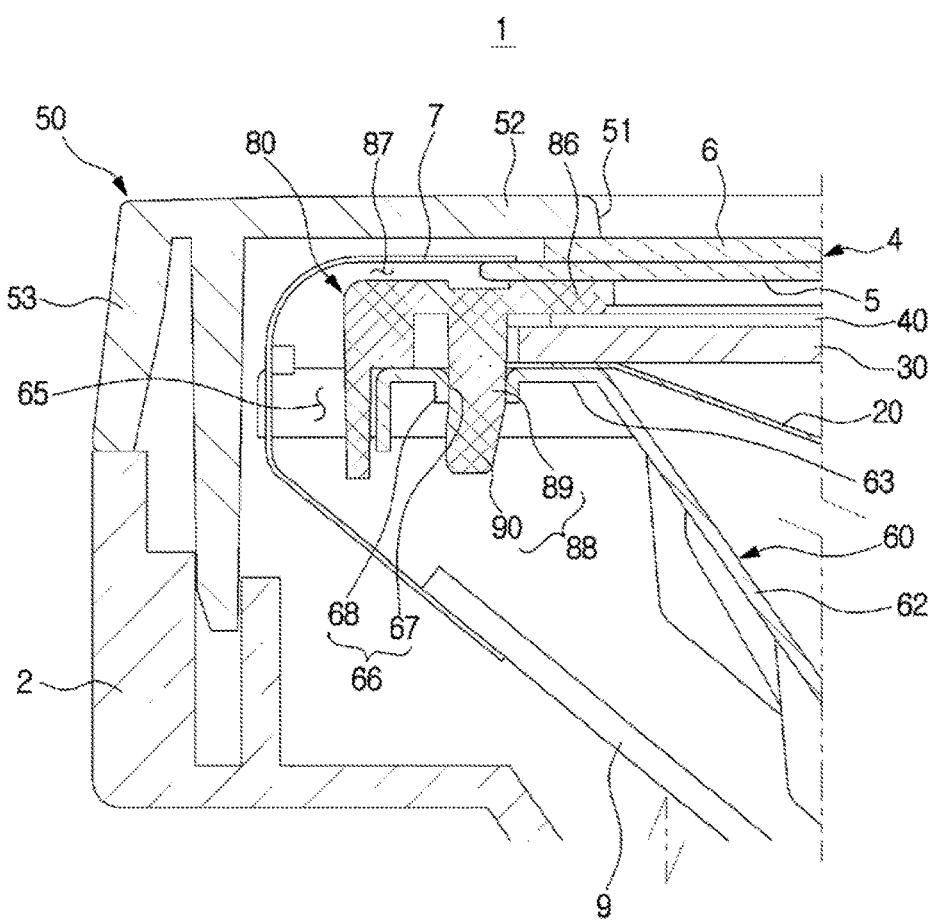
FIG. 5 is a cross-sectional view taken along line V-V of FIG. 3.
Figure 6:
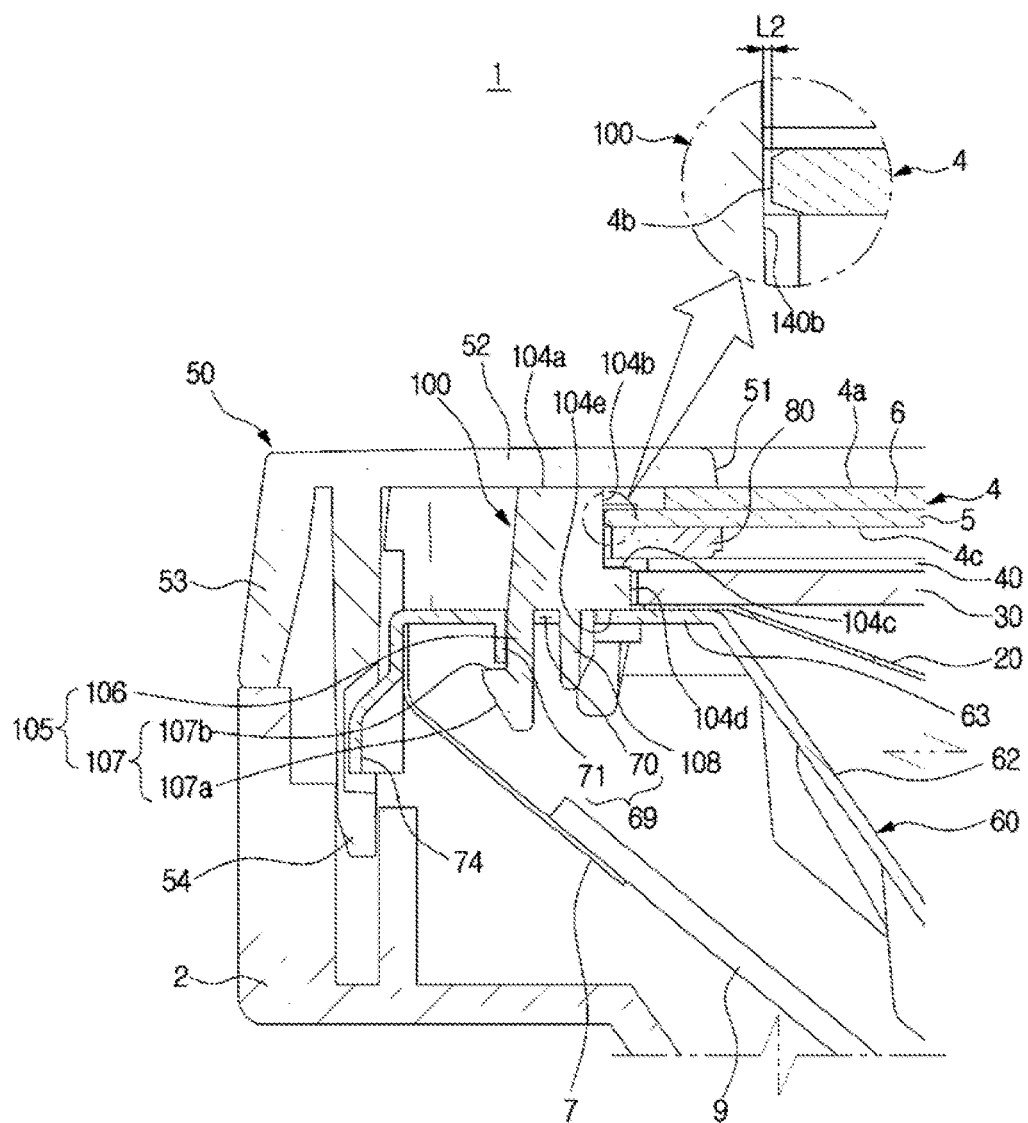
FIG. 6 is a cross-sectional view taken along line VI-VI of FIG. 3.
Figure 7:
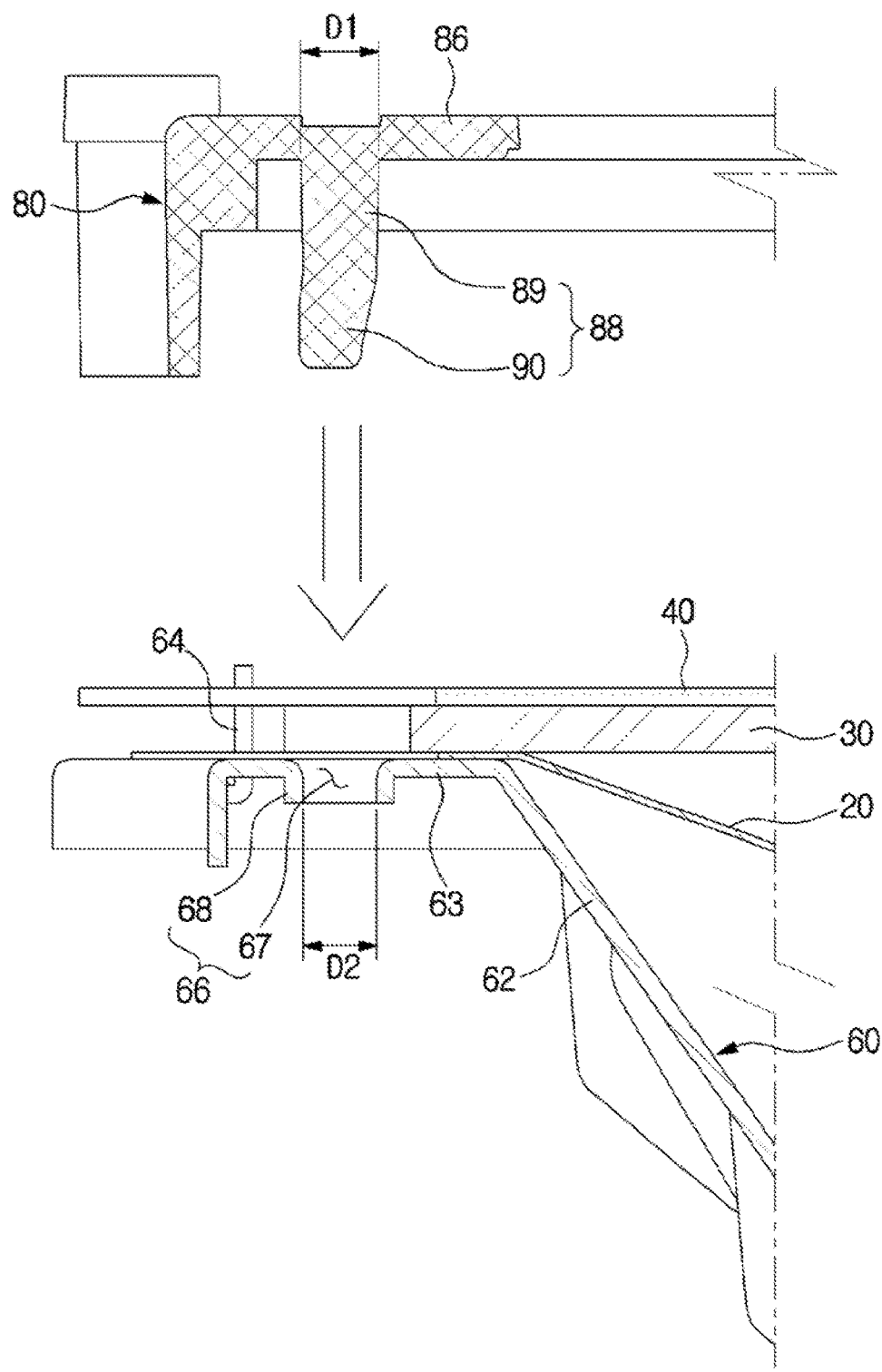
FIG. 7 is a view for describing a process of coupling a frame to a bottom chassis of the display apparatus of FIG. 1.
Figure 8:
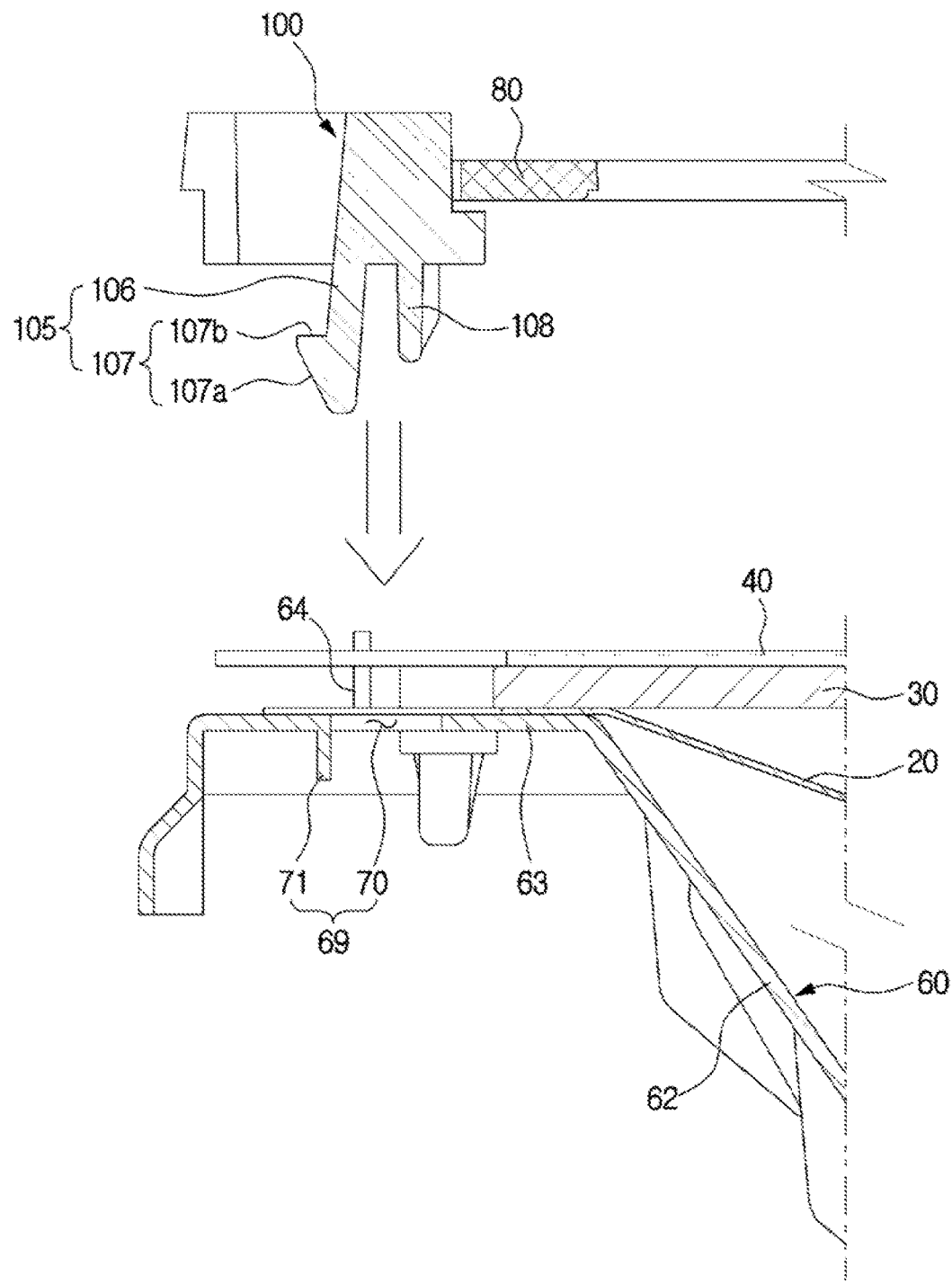
FIG. 8 is a view for describing a process of coupling a reinforcement member to the bottom chassis of the display apparatus of FIG. 1.
Figure 9:
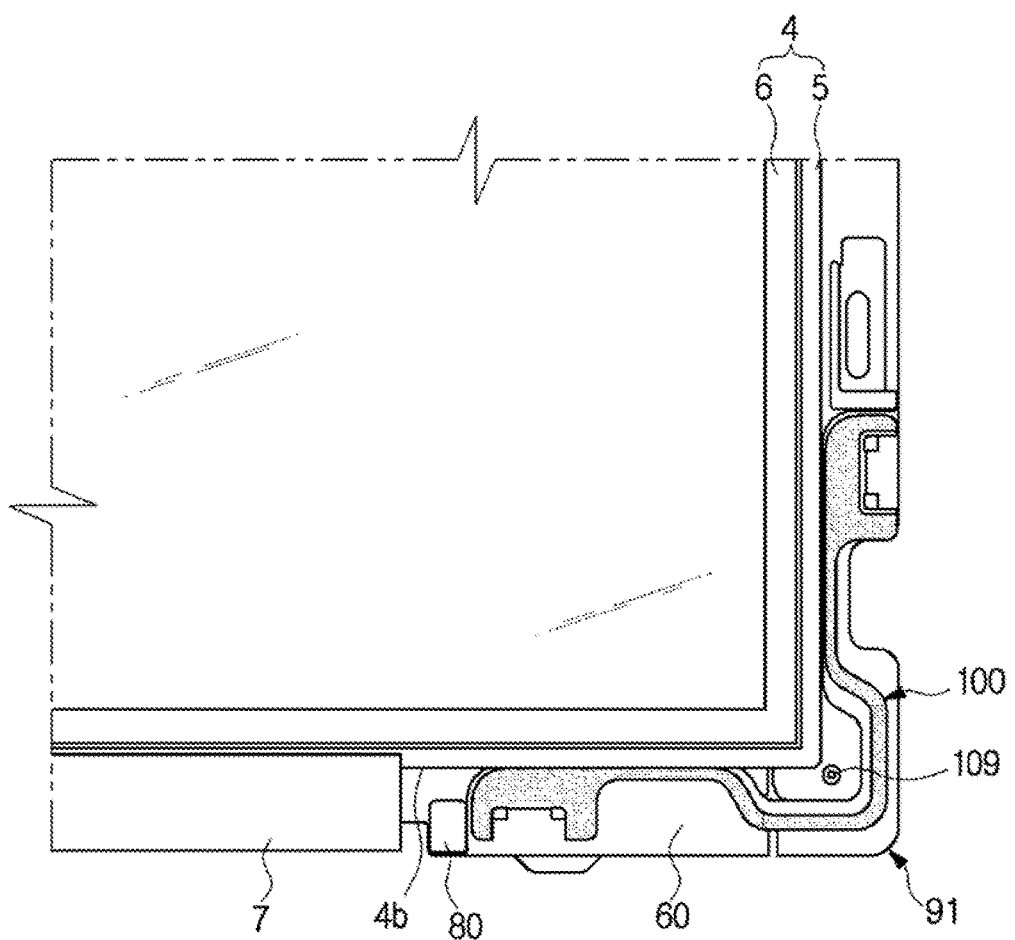
FIG. 9 is a front view illustrating a structure in which the reinforcement member of the display apparatus of FIG. 1 supports a side surface of a liquid crystal panel (top chassis is omitted)
Figure 10:
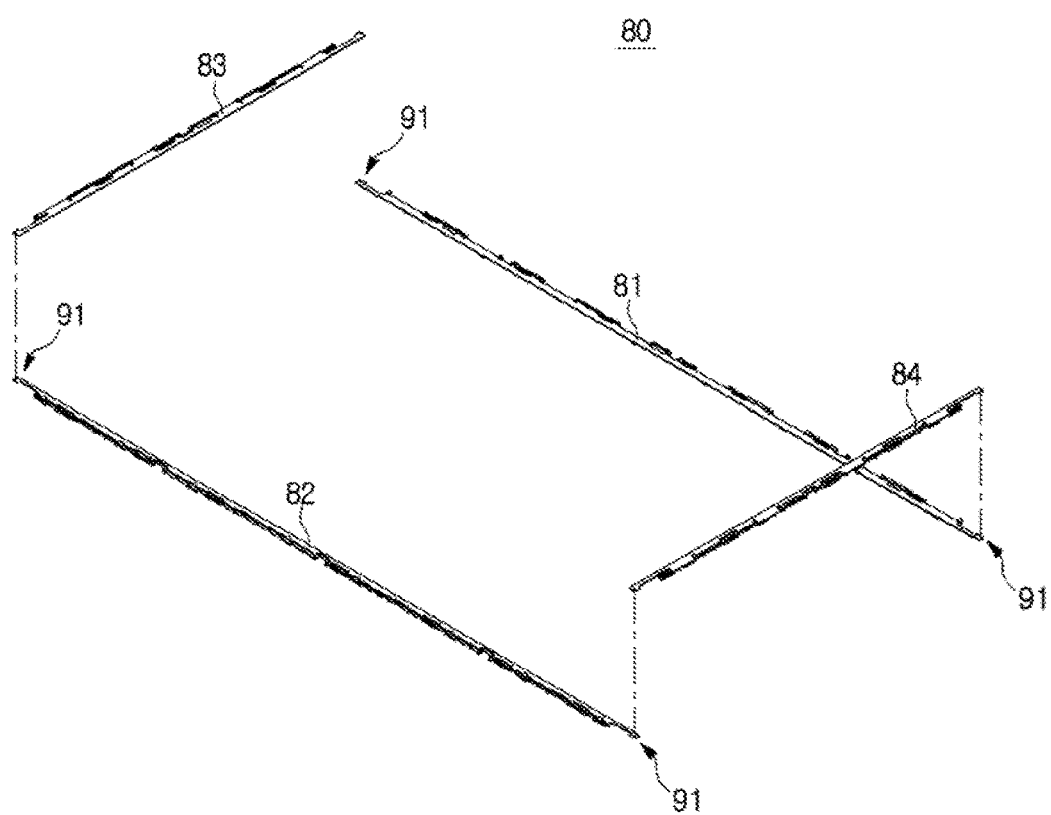
FIG. 10 is an exploded view illustrating a frame of the display apparatus of FIG. 1.
Figure 11:
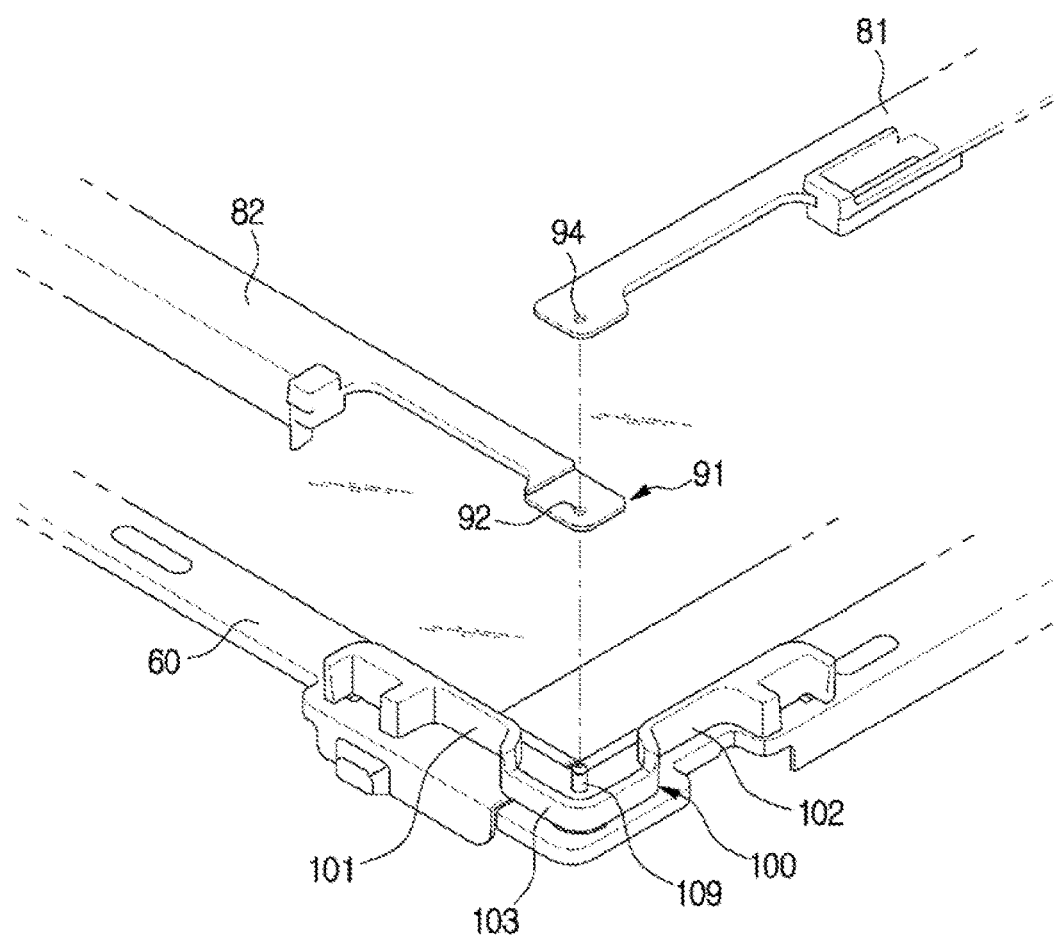
FIG. 11 is a view illustrating a coupling structure between the frame and the reinforcement member of the display apparatus of FIG. 1.
Figure 12:
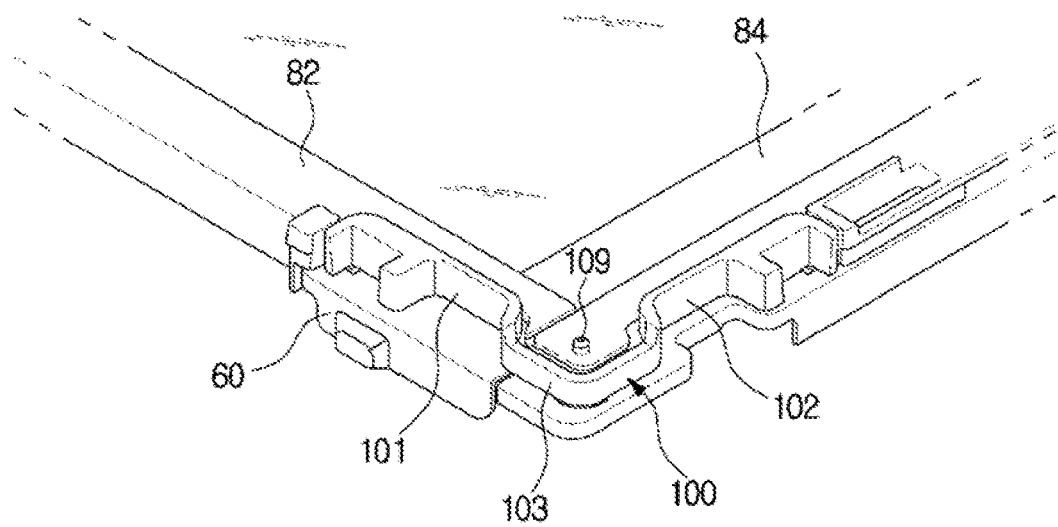
FIG. 12 is an enlarged view illustrating a coupling state between the frame and the reinforcement member of the display apparatus of FIG. 1.

FIG. 1 is a perspective view illustrating a display apparatus 1 according to an exemplary embodiment of the present disclosure. FIG. 2 is an exploded view illustrating components of the display apparatus 1 of FIG. 1. FIG. 3 is a view illustrating an enlarged portion of the illustrated components of FIG. 2. FIG. 4 is a cross-sectional view taken along line IV-IV of FIG. 3. FIG. 5 is a cross-sectional view taken along line V-V of FIG. 3. FIG. 6 is a cross-sectional view taken along line VI-VI of FIG. 3. FIG. 7 is a view for describing a process of coupling a frame to a bottom chassis of the display apparatus 1 of FIG. 1. FIG. 8 is a view for describing a process of coupling a reinforcement member 100 to the bottom chassis 60 of the display apparatus 1 of FIG. 1. FIG. 9 is a front view illustrating a structure in which the reinforcement member 100 of the display apparatus 1 of FIG. 1 supports a side surface of a liquid crystal panel 4 (top chassis is omitted). FIG. 10 is an exploded view illustrating a frame 80 of the display apparatus 1 of FIG. 1. FIG. 11 is a view illustrating a coupling structure between the frame 80 and the reinforcement member 100 of the display apparatus 1 of FIG. 1. FIG. 12 is an enlarged view illustrating a coupling state between the frame 80 and the reinforcement member 100 of the display apparatus 1 of FIG. 1.

A display apparatus 1 is an apparatus that displays various visual information as images on a screen. The display apparatus 1 includes, for example, TVs, which are telecommunication media used to receive and output moving images and image signals, and monitors, tablet PCs, smart phones, and various mobile terminals which are computer output devices.

The display apparatus 1 may have a flat screen or a curved screen in which right and left edges are curved forward with respect to the center portion of the display apparatus 1.

Alternatively, the display apparatus 1 may have a bendable screen that changes in shape thereof from a flat surface to a curved surface and vice versa, or that changes in a curvature of the curved surface.

The display apparatus 1 includes a liquid crystal panel 4 to display an image, a backlight unit BU disposed behind the liquid crystal panel 4 and supplying light to the liquid crystal panel 4, a bottom chassis 60 disposed behind the backlight unit BU, and a frame 80 to support the liquid crystal panel 4, and the like.

The liquid crystal panel 4 is a display unit of the display apparatus 1 using a liquid crystal that has different optical properties in accordance with voltage and temperature changes.

The liquid crystal panel 4 includes a thin film transistor (TFT) substrate 5, a color filter substrate 6 coupled to the TFT substrate 5 to face each other, and a liquid crystal (not shown) injected between the TFT substrate 5 and the color filter substrate 6.

The TFT substrate 5 is a transparent substrate on which TFTs, as switching elements, are arranged in a matrix shape. The color filter substrate 6 is a transparent substrate having RGB color pixels, which generate predetermined colors, formed by a thin film process.

A data signal transmission film 7 (FIG. 3) may be connected to a data terminal of the TFT substrate 5. A data printed circuit board 9 may be connected to the data signal transmission film 7. The data printed circuit board 9 may generate a data driving signal by receiving an external image signal and apply the data driving signal to the data signal transmission film 7.

A gate signal transmission film 8 (FIG. 3) may be connected to a gate terminal of the TFT substrate 5. The gate signal transmission film 8 may be connected to a gate printed circuit board (not shown). The gate printed circuit board (not shown) may generate a gate driving signal by receiving an external image signal and apply the gate driving signal to the gate signal transmission film 8.

The data signal transmission film 7 and the gate signal transmission film 8 may be a chip on flexible printed circuit board (COF) type in which driving chips are mounted on a flexible printed circuit board.

Although the data signal transmission film 7 is connected to a lower side of the liquid crystal panel 4 and the gate signal transmission film 8 is connected to a right side of the liquid crystal panel 4, the exemplary embodiment is not limited thereto. For example, the data signal transmission film 7 and the gate signal transmission film 8 may also be connected to another side of the liquid crystal panel 4.

In addition, the data printed circuit board 9 and the gate printed circuit board may be integrated with each other into one printed circuit board. Accordingly, the data signal transmission film 7 and the gate signal transmission film 8 may also be integrated with each other into one signal transmission film. To this end, a wiring may be formed on the TFT substrate 5 or a driving chip may be mounted thereon.

The backlight unit BU is disposed behind the liquid crystal panel 4 and illuminates the liquid crystal panel 4. Backlight units may be classified, according to the position of a light source, into direct type backlight units having a structure in which the light source is arranged directly behind the liquid crystal panel and edge type backlight units having a structure in which the light source is disposed behind the liquid crystal panel at an edge. The edge type backlight units may include a light guide plate (LGP) to guide light emitted from the light source toward the liquid crystal panel.

Although a direct type backlight unit is illustrated herein, exemplary embodiments are not limited thereto. For example, an edge type backlight unit may also be used and this will be described later.

The backlight unit BU includes a light source module 10, which includes a light source 11 and a substrate 12 on which the light source 11 is mounted, and an optical member OM arranged in a path of light emitted from the light source 11 toward the liquid crystal panel 4.

The light source 11 may include an LED package in which LED chips are coated with a transparent resin. However, the exemplary embodiment is not particularly limited with respect to the type of light source.

A plurality of light sources 11 may be mounted on the substrate 12 in a line or in various shapes according to the design intent. Alternatively, one light source 11 may be mounted on the substrate 12. A driving power line, and the like to supply driving power to the light source 11 may be formed on the substrate 12 and may be connected to a signal cable (not shown) and a backlight driving circuit (not shown).

A cold cathode fluorescent lamp (CCFL) and an external electrode fluorescent lamp (EEFL) may also be used as the light source 11 in addition to the LED package.

The optical member OM may be arranged in a path of light emitted from the light source 11 toward the liquid crystal panel 4 to guide a proceeding direction of light, reflect light, scatter light, or improve optical characteristics of light.

The optical member OM may include, for example, a reflector plate 20 to prevent light loss by reflecting light, a diffuser plate 30 to uniformly diffuse light non-uniformly emitted from the light source 11, and an optical sheet 40 to improve optical characteristics of light.

The reflector plate 20 reflects light emitted from the light source 11 incident on a rear surface 33 of the diffuser plate 30 or reflects light diffused backward from the diffuser plate 30 incident on the rear surface 33 of the diffuser plate 30 again.

The reflector plate 20 may be manufactured by coating a material having a high reflectance on a base material which is not reflective in nature. Examples of the base material may include Steel Use Stainless (SUS), brass, aluminum, and polyethylene terephthalate (PET), and examples of a highly reflective coating material may include silver and $TiO_2$.

The reflector plate 20 may be disposed in front of the bottom chassis 60. The reflector plate 20 may include a support hole 21 (FIG. 3) at an edge of thereof to support the reflector plate 20, and a support protrusion 64 (FIG. 3) of the bottom chassis 60 is inserted into the support hole 21 to prevent movement of the reflector plate 20 and support the reflector plate 20.

The reflector plate 20 may have a through-hole 22 (FIG. 2) through which the light source 11 is fitted or passes through.

The diffuser plate 30 uniformly diffuses light non-uniformly generated by the light source 11 disposed below the diffuser plate 30 and supports various optical sheets 40. The diffuser plate 30 may have the same functions as a light guide plate (e.g., element 730 in FIG. 7) in a direct type backlight unit BU.

The diffuser plate 30 uniformly diffuses light incident on the rear surface 33 thereof and emits the diffused light via a front surface 31. The diffuser plate 30 is disposed in front of the reflector plate 20, and side surfaces 32 thereof may be arranged to be space apart from the frame 80 by a predetermined interval in consideration of thermal expansion.

The optical sheet 40 may be disposed in front of the diffuser plate 30 to improve optical characteristics of light emitted from the diffuser plate 30.

The optical sheet 40 includes a diffuser sheet. Because light scattered by the diffuser plate 30 directly reaches eyes of a viewer, the viewer may directly see a pattern of the diffuser plate 30. Thus, the diffuser sheet offsets or minimizes the pattern of the diffuser plate 30.

The optical sheet 40 includes a prism sheet. Because brightness of light having passed through the diffuser sheet rapidly decreases due to light scattering, the prism sheet may concentrate light to increase brightness.

The optical sheet 40 includes a protection sheet. The protection sheet protects the optical sheet 40 from external impact or foreign substances.

Although the optical sheet 40 includes three sheets of the diffuser sheet, the prism sheet, and the protection sheet as described above in the exemplary embodiment, at least one of the three sheets may be dispensed with, one or two composite sheets having composite properties may be used.

For example, the optical sheet 40 may be implemented using a dual brightness enhancement film (DBEF) that is a composite sheet having properties of a diffuser sheet and a high-brightness prism sheet.

According to the exemplary embodiment, one composite sheet is used as the optical sheet 40.

The optical sheet 40 is disposed in front of the diffuser plate 30 and supported by the diffuser plate 30, the frame 80, and the bottom chassis 60. The optical sheet 40 has a support hole 41 (FIG. 3) at an edge thereof, and the support protrusion 64 (FIG. 3) of the bottom chassis 60 is inserted into the support hole 41 to prevent movement of the optical sheet 40 and support the optical sheet 40.

The bottom chassis 60 is disposed behind the backlight unit BU. The bottom chassis 60 may have a curved or flat panel shape and accommodate the liquid crystal panel 4 and the backlight unit BU of the display apparatus 1 together with a top chassis 50.

Various components of the display apparatus 1 such as the top chassis 50 and the frame 80 may be coupled to and supported by the bottom chassis 60.

The bottom chassis 60 may dissipate heat generated by an inner heat generating device such as the light source 11. The bottom chassis 60 may be formed of various metallic materials such as aluminum and SUS or plastic materials such as ABS.

The bottom chassis 60 includes a bottom part 61 (FIG. 2) formed at the rear thereof, a bottom extension part 62 (FIG. 2) orthogonally extending forward from the bottom part 61, and a bottom coupling part 63 formed at edges of the bottom chassis 60 to be coupled the top chassis 50 and the frame 80.

The bottom chassis 60 includes a support protrusion 64 that is inserted into the support hole 21 of the reflector plate 20 and the support hole 41 of the optical sheet 40 to support the reflector plate 20 and the optical sheet 40. The support protrusion 64 may protrude forward from the bottom coupling part 63.

The bottom chassis 60 may include a film pass part 65 (FIG. 3) formed to be recessed such that the signal transmission films 7 and 8 of the liquid crystal panel 4 pass therethrough. The signal transmission films 7 and 8 may extend backward from the bottom chassis 60 through the film pass part 65, and thus a size of a bezel part of the top chassis 50 is not required to be unnecessarily increased.

The bottom chassis 60 may include an insertion hole part 66 (FIGS. 5 and 7) to be coupled to the frame 80. The insertion hole part 66 may include a bush part 68 integrally extending from the bottom coupling part 63 to protrude backward and having a cylindrical shape, and an insertion hole 67 formed in the bush part 68.

An insertion protrusion part 88 of the frame 80 may be coupled to the insertion hole part 66 of the bottom chassis 60 by insertion fitting. This will be described later.

The bottom chassis 60 may include a locking hole part 69 (FIG. 8) to be coupled to a reinforcement member 100. The locking hole part 69 may have a locking hole 70 formed at the bottom coupling part 63 and an interference part 71 integrally extending from the bottom coupling part 63.

A hook protrusion part 105 of the reinforcement member 100 may be coupled to the locking hole part 69 of the bottom chassis 60 by a hook connection. This will be described later.

A rear cover 2 may be coupled to the rear of the bottom chassis 60. The rear cover 2 defines a rear appearance of the display apparatus 1. A circuit board 3 to control driving various elements of the display apparatus 1 may be arranged between the bottom chassis 60 and the rear cover 2. The display apparatus 1 may include a leg 2a for support.

The display apparatus 1 may include a top chassis 50 that includes a bezel part 52 to support edges of the front surface of the liquid crystal panel 4 and has an opening 51 to expose the liquid crystal panel 4 therein forward.

The top chassis 50 may include a top chassis side part 53 extending backward from the bezel part 52. The top chassis 50 may be coupled to the bottom chassis 60. For example, the top chassis side part 53 of the top chassis 50 may include a coupling hook part 54 (FIG. 6) coupled to a hook holder part 74 (FIG. 6) of the bottom chassis 60.

The frame 80 may have an almost rectangular shape with an opening 95 and be disposed between the top chassis 50 and the bottom chassis 60.

The frame 80 may support the liquid crystal panel 4 and the optical member OM of the backlight unit BU. The frame 80 may include a frame body part 85 having an intermediate support part 86 protruding toward the opening 95 at a position between the front end and the rear end.

The frame body part 85 may have a first support surface 85a, a second support surface 85b, a third support surface 85c, a fourth support surface 85d, a fifth support surface 85e, and a sixth support surface 85f (FIG. 4).

The first support surface 85a may support a rear surface of the bezel part 52 of the top chassis 50.

The second support surface 85b may support a side surface 4b of the liquid crystal panel 4. The second support surface 85b may be spaced apart from the side surface 4b of the liquid crystal panel 4 by a predetermined interval L1 (FIG. 4).

The third support surface 85c may support a rear surface 4c of the liquid crystal panel 4. The third support surface 85c may be formed on the intermediate support part 86 of the frame 80. The third support surface 85c may have a flat surface without having protrusions and grooves to stably support the liquid crystal panel 4.

The fourth support surface 85d may support a front surface of the optical sheet 40. The fourth support surface 85d may be formed on the intermediate support part 86 of the frame 80.

The fifth support surface 85e may support side surfaces of the optical sheet 40, the diffuser plate 30, and the reflector plate 20. The fifth support surface 85e may be spaced apart from the optical sheet 40, the diffuser plate 30, and the reflector plate 20 by predetermined intervals in consideration of thermal expansion of the optical sheet 40, the diffuser plate 30, and the reflector plate 20.

The sixth support surface 85f may support the bottom chassis 60.

Through the above-described configuration, the frame 80 may support the liquid crystal panel 4 together with the top chassis 50 and support the optical member OM of the backlight unit BU together with the bottom chassis 60.

The intermediate support part 86 may protrude between the liquid crystal panel 4 and the optical sheet 40 to space the liquid crystal panel 4 and the optical sheet 40 apart from each other by a predetermined interval.

Because the frame 80 supports various components of the display apparatus 1 as described above, friction between the frame 80 and the components of the display apparatus 1 may be caused while the components of the display apparatus 1 are assembled or the display apparatus 1 is transported.

Particularly, because fine patterns or protrusions are formed on the surfaces of the diffuser plate 30 and optical sheet 40, and the diffuser plate 30 and the optical sheet 40 are formed of relatively hard plastic materials, the surface of a frame of the related art formed of a plastic material such as Acrylonitrile-Butadiene-Styrene (ABS) may be scratched, grated, and scraped due to friction between the frame 80 and the components.

As the frame 80 is grated or scraped, any of dust, foreign substances, and particles, for example, may be generated. These dust, foreign substances, and particles may deteriorate display performance of the display apparatus 1, may cause a breakdown of the display apparatus 1, or may decrease reliability of the display apparatus 1.

Friction may be generated at each support surface of the frame 80. That is, when a structure is generally assembled by sequentially stacking the reflector plate 20, the diffuser plate 30, the optical sheet 40, the frame 80, the liquid crystal panel 4, and the top chassis 50 on the bottom chassis 60, friction may be generated between the fifth support surface 85e of the frame 80 and the side surfaces of the reflector plate 20, the diffuser plate 30, and the optical sheet 40. In addition, friction may be generated between the fourth support surface 85d of the frame 80 and the front surface of the optical sheet 40.

The frame 80 may be formed of a rubber material having a rigidity sufficient for supporting the various components of the display apparatus 1 to reduce damages caused by the friction. Thus, the frame 80 is relatively flexible and soft.

Here, rubber is a synthetic polymeric compound distinguished from a synthetic resin (plastic) and a synthetic fiber. Rubber that is a polymeric material having elasticity is classified into natural rubber obtained from rubber trees and synthetic rubber obtained from petroleum byproducts.

Natural rubber is a natural polymeric compound consisting of a plurality of isoprene and has high elasticity and strength. However, because natural rubber loses elasticity and gets sticky by heat, vulcanized rubber produced by adding sulfur to rubber via a vulcanization process is generally used to improve elasticity and strength. During the vulcanization process, chain-shaped isoprene polymers are cross-linked by sulfur to form a three-dimensional net structure, and thus elasticity and tensile strength thereof may be improved.

The synthetic rubber is a synthetic polymeric material having elasticity similar to that of natural rubber.

Rubber includes plastic rubber such as thermoplastic elastomer (TPE) rubber and thermoplastic vulcanization (TPV) rubber.

The TPV rubber is a high-functional polymer material having properties of rubber, i.e., elasticity, at room temperature and easily processed as a thermoplastic resin. The TPV rubber has high hardness and high scratch-resistance.

The TPV rubber may be formed by mixing an ethylene propylene diene monomer (EPDM) rubber, a polyolefin resin, and a petroleum-based softener.

That is, because the TPV rubber is formed of a mixture of the polyolefin resin, as a hard segment, and the EPDM rubber, as a soft segment, via dynamic curing, physical properties thereof are the same as those of a thermosetting cross-linked rubber at room temperature. However, the TPV rubber may become a thermoplastic elastomer by heating to be easily molded in the same manner as general-use thermoplastic resins.

The EPDM rubber, which is a thermoplastic synthetic rubber prepared via terpolymerization of ethylene, propylene, and diene, may be added to the TPV rubber at an appropriate ratio to improve flexibility.

The polyolefin resin may be added to the TPV rubber at an appropriate ratio to improve heat resistance and hardness. When the content of polyolefin decreases, heat resistance of the TPV rubber may decrease. On the other hand, when the content of polyolefin increases, resilience may decrease.

The polyolefin resin may include at least one selected from the group consisting of polyethylene and polypropylene (PP). To improved heat resistance, polypropylene may be used.

The petroleum-based softener may be added to the TPV rubber at an appropriate ratio to reduce hardness. As the content of the petroleum-based softener decreases, hardness may increase. On the other hand, as the content of the petroleum-based softener increases, the TPV rubber may get sticky due to oil breeding.

The petroleum-based softener may be paraffin oil, without being limited thereto. For example, Naphthene may also be used as the petroleum-based softener.

Because the frame 80 is formed of a rubber material, preferably, a plastic rubber material, as described above, the surface of the frame 80 may be less scratched, grated, and scraped due to friction between the frame 80 and the components of the display apparatus 1. Thus, deterioration in display performance of the display apparatus 1, a breakdown of the display apparatus 1, and reduction in reliability caused by dust, foreign substances, and particles may be prevented.

In addition, although a silicon rubber tape is attached to a support surface of a frame of the related art corresponding to the third support surface 85c of the frame 80 in order to prevent movement of the liquid crystal panel 4 and minimize friction, the tape is not required in the frame 80 according to the exemplary embodiment. Thus, the number of parts may be reduced and a manufacturing process may be simplified.

Because the frame 80 may be formed by injection molding in the same manner as the frame of the related art formed of a plastic material such as ABS, there is no difficulty in a molding process.

The frame 80 may be white in color to prevent thermal deformation caused by absorption of light emitted from the light source 11 and so as not to be directly recognized from the outside of the display apparatus 1.

As shown in FIG. 10, the frame 80 may be formed by coupling a first longer side frame 81 constituting an upper side, a second longer side frame 82 constituting a lower side, a first shorter side frame 83 constituting a left side, and a second shorter side frame 84 constituting a right side, which are separately prepared.

A pair of longer side frames 81 and 82 may be longer than a pair of shorter side frames 83 and 84. That is, the frame 80 may have a rectangular shape with a length longer than a width.

The first longer side frame 81, the second longer side frame 82, the first shorter side frame 83, and the second shorter side frame 84 may be coupled to one another using various known coupling methods through a fitting structure using, for example, a protrusion and a groove, a fastening structure using an additional fastening member such as a screw, pin, and rivet, or an adhering structure using an adhesive member.

In addition, the first longer side frame 81, the second longer side frame 82, the first shorter side frame 83, and the second shorter side frame 84 may be coupled to each other via the reinforcement member 100. This will be described later.

However, the first longer side frame 81, the second longer side frame 82, the first shorter side frame 83, and the second shorter side frame 84 may also be formed integrally with one another.

The frame 80 may include a film pass part 87 (FIG. 3) to be recessed at a position corresponding to the film pass part 65 of the bottom chassis 60 such that the signal transmission films 7 and 8 of the liquid crystal panel 4 penetrate therethrough.

The frame 80 may be coupled to the bottom chassis 60. Particularly, because the frame 80 is formed of a rubber material having elasticity as described above, the frame 80 may be coupled to the bottom chassis 60 by insertion fitting.

Fit is a method of coupling two parts including a shaft (i.e., a male part) and a hole (i.e., a female part) to fit together with appropriate clearance and interference.

Fit includes a clearance fit providing a clearance between the shaft (the male part) and the hole (the female part), an interference fit providing an interference between the parts, and a transition fit providing either a clearance or an interference.

The frame 80 includes the insertion protrusion part 88 (FIGS. 5 and 7) to be coupled to the bottom chassis 60 by fitting. The insertion protrusion part 88 may protrude backward (i.e., toward the rear cover 2) from the frame body part 85.

The insertion protrusion part 88 is coupled to the insertion hole part 66 of the bottom chassis 60 by fitting.

The insertion protrusion part 88 includes an insertion body part 89 inserted into the insertion hole 67 of the bottom chassis 60. Referring to FIG. 7, a dimension D1 of the insertion body part 89 is greater than a dimension D2 of the insertion hole 67. Thus, when the insertion body part 89 is inserted into the insertion hole 67, the insertion body part 89 is slightly elastically deformed to fit the insertion hole 67.

In this regard, the dimension refers to an outer diameter of the insertion body part 89 and an inner diameter or size of the insertion hole 67 corresponding thereto.

The insertion body part 89 may be stably coupled to the bottom chassis 60 by elasticity that is an ability to return to its original shape.

The insertion body part 88 of the frame 80 may be stably supported by the bush part 68 of the bottom chassis 60.

The insertion protrusion part 88 may include a guide part 90 extending from the insertion body part 89 to guide the insertion body part 89 when the insertion body part 89 is inserted into the insertion hole 67. The guide part 90 may be inclined to be outwardly tapered.

The frame 80 may be easily decoupled from the bottom chassis 60 after coupling by simply pulling the frame 80.

The frame 80 may include at least one insertion protrusion part 88.

The display apparatus 1 may include the reinforcement member 100 to reinforce supporting other components by the frame 80.

The reinforcement member 100 does not have a shape corresponding to the rectangular shape of the frame 80 but may be provided, for example, only at four corner parts 91 of the frame 80. That is, the reinforcement members 100 may be arranged at corners of the bottom chassis 60.

Although four reinforcement members 100 are respectively arranged at four corner parts 91 herein, the present exemplary embodiment is not limited thereto. For example, the reinforcement members 100 may be disposed only at two diagonally opposite corner parts 91 (FIG. 9). The shapes and functions of the reinforcement members 100 may be the same or similar.

The reinforcement member 100 may include two arm parts 101 and 102 extending from a central part 103 (FIGS. 11 and 12). Two arm parts 101 and 102 may be perpendicular to each other. The shapes and functions of the first arm part 101 and the second arm part 102 may be the same or similar.

Each of the first arm part 101 and the second arm part 102 of the reinforcement member 100 may have a first reinforcement support surface 104a, a second reinforcement support surface 104b, a third reinforcement support surface 104c, a fourth reinforcement support surface 104d, and a fifth reinforcement support surface 104e (FIG. 6).

The first reinforcement support surface 104a may support a rear surface of the bezel part 52 of the top chassis 50.

The second reinforcement support surface 104b may support a side surface 4b of the liquid crystal panel 4 and a side surface of the frame 80. The second reinforcement support surface 104b may be spaced apart from the side surface 4b of the liquid crystal panel 4 by a predetermined interval L2 (FIG. 6) or may be almost in contact with the side surface 4b.

Thus, the reinforcement member 100 may further prevent movement of the liquid crystal panel 4, which is relatively heavier than the other components, and safely protect the liquid crystal panel 4.

The predetermined interval L2 between the second reinforcement support surface 104b of the reinforcement member 100 and the side surface 4b of the liquid crystal panel 4 may be smaller than the predetermined interval L1 (FIG. 4) between the second support surface 85b of the frame 80 and the side surface 4b of the liquid crystal panel 4.

The third reinforcement support surface 104c may support the rear surface of the frame 80.

The fourth reinforcement support surface 104d may support a side surface of the optical sheet 40, the diffuser plate 30, or the reflector plate 20.

The fifth reinforcement support surface 104e may support the bottom chassis 60.

Throughout this configuration, the reinforcement member 100 may assist the frame 80 to more stably support the liquid crystal panel 4, the top chassis 50, and the bottom chassis 60.

The reinforcement member 100 may be formed of the same material as the frame 80 or a different material from the frame 80 to provide greater supporting force. For example, the reinforcement member 100 may be formed of a plastic material such as acrylonitrile butadiene styrene (ABS) and polypropylene (PP), a glass fiber, a metallic material, or the like.

The reinforcement member 100 may be coupled to the bottom chassis 60. The reinforcement member 100 may be coupled to the bottom chassis 60 by a hook connection.

To this end, the reinforcement member 100 may include a hook protrusion part 105 coupled to the locking hole part 69 of the bottom chassis 60 by a hook connection and a rotation prevention part 108 to prevent the reinforcement member 100 from rotating and being decoupled from the bottom chassis 60.

The hook protrusion part 105 may be elastically deformed during a coupling process. The hook protrusion part 105 may include a hook body part 106 protruding to penetrate the locking hole 70 of the bottom chassis 60 and a hook holding part 107 held by the interference part 71 of the bottom chassis 60.

The hook holding part 107 may protrude from the hook body part 106 in one direction. The hook holding part 107 may include a guiding surface 107a to guide the hook holding part 107 to penetrate the locking hole 70 while the reinforcement member 100 is coupled thereto and a holding surface 107b held by the interference part 71 of the bottom chassis 60 after the hook holding part 107 penetrates the locking hole 70 to fix the reinforcement member 100.

The reinforcement member 100 may be decoupled from the bottom chassis 60 by pulling the reinforcement member 100 while moving the hook holding part 107 so as to remove interference between the hook holding part 107 and the interference part 71.

Although the reinforcement member 100 is coupled to the bottom chassis 60 by a hook connection according to the exemplary embodiment, the reinforcement member 100 may also be coupled to the bottom chassis 60 via various other methods using an adhesive member or using a separate fastening member such as a screw, pin, and rivet, or via fitting methods.

The reinforcement member 100 may be directly coupled to the frame 80 as well as supporting the frame 80. Because the frame 80 is coupled to the reinforcement member 100 as described above, the frame 80 may have reinforced rigidity and may be maintained in a more stable state.

To this end, the reinforcement member 100 may include a connection protrusion 109 (FIG. 11). The connection protrusion 109 may be disposed at the central part 103 of the reinforcement member 100. The connection protrusion 109 may protrude from the front of the reinforcement member 100. The connection protrusion 109 may be inserted into connection holes 92 and 94 (FIG. 11) respectively formed in the longer side frame 82 and the shorter side frame 84 of the frame 80.

Thus, as the connection protrusion 109 of the reinforcement member 100 is inserted into the connection holes 92 and 94 of the frame 80, the frame 80 may be coupled to the reinforcement member 100. As a result, the longer side frame 82 and the shorter side frame 84 may be coupled to each other.

However, the exemplary embodiment is not limited thereto. For example, the reinforcement member 100 may have a connection hole, and the frame 80 may have a connection protrusion.

Figure 13:
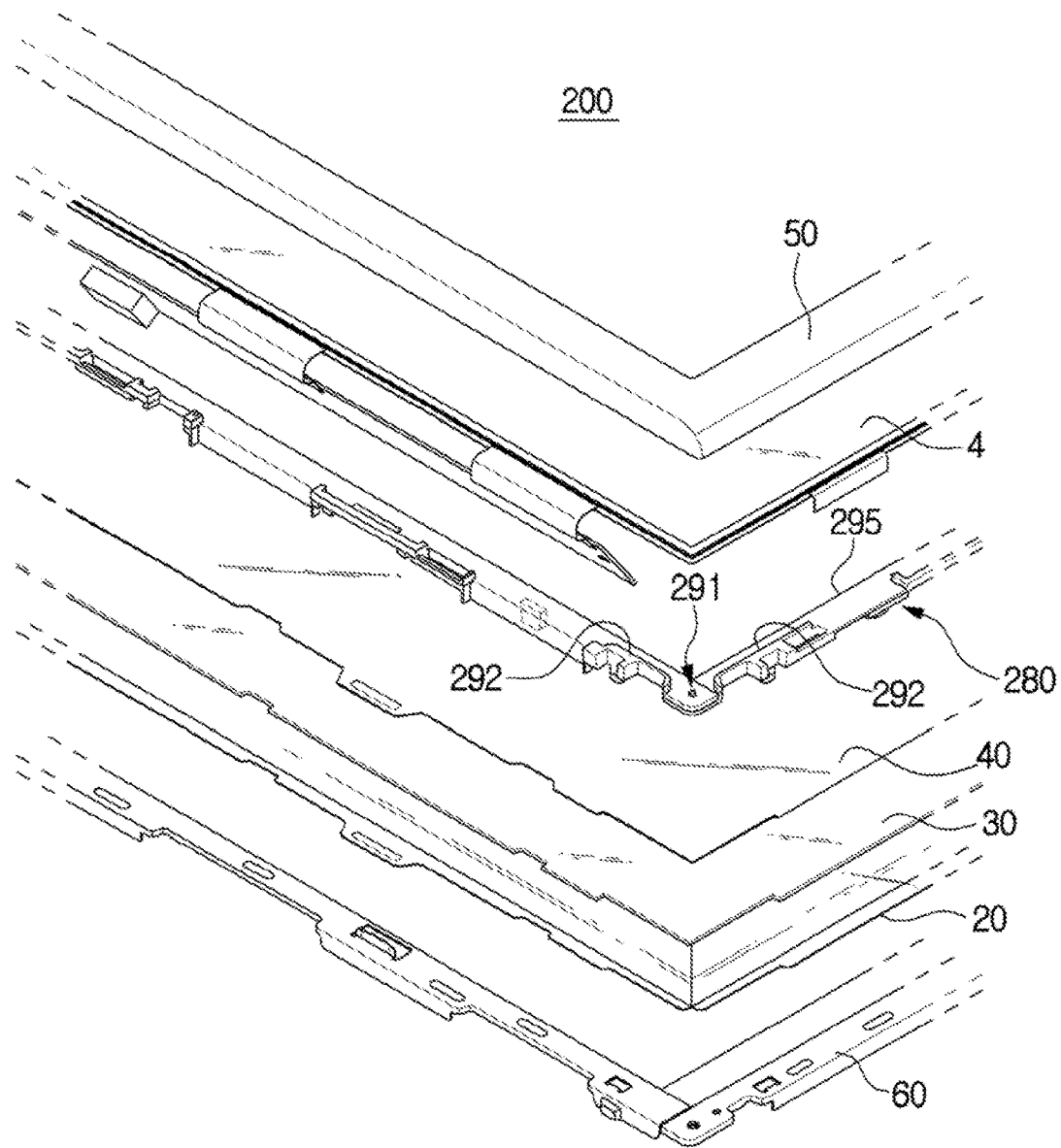
FIG. 13 is an exploded perspective view illustrating a display apparatus 200 according to an exemplary embodiment.

FIG. 13 is an exploded perspective view illustrating a display apparatus 200 according to an exemplary embodiment of the present disclosure.

The same reference numerals are used to describe the same elements as those of the aforementioned exemplary embodiment shown in FIGS. 1-12, and descriptions thereof will not be repeated.

The reinforcement member 100 of the previous exemplary embodiment shown in, for example, FIGS. 3 and 12 is not a necessity and may be omitted with if a frame 280 shown in FIG. 13 provides sufficient supporting force.

The frame 280 may include a corner support part 292 disposed at a corner part 291 and protruding toward an opening 295 to prevent movement of the liquid crystal panel 4 and protect the liquid crystal panel 4 instead of the reinforcement member 100 according to the exemplary embodiment of FIGS. 3 and 12.

Because the other parts of the frame 280 are the same as those of the previous exemplary embodiment, descriptions thereof will not be repeated herein.

Figure 14:
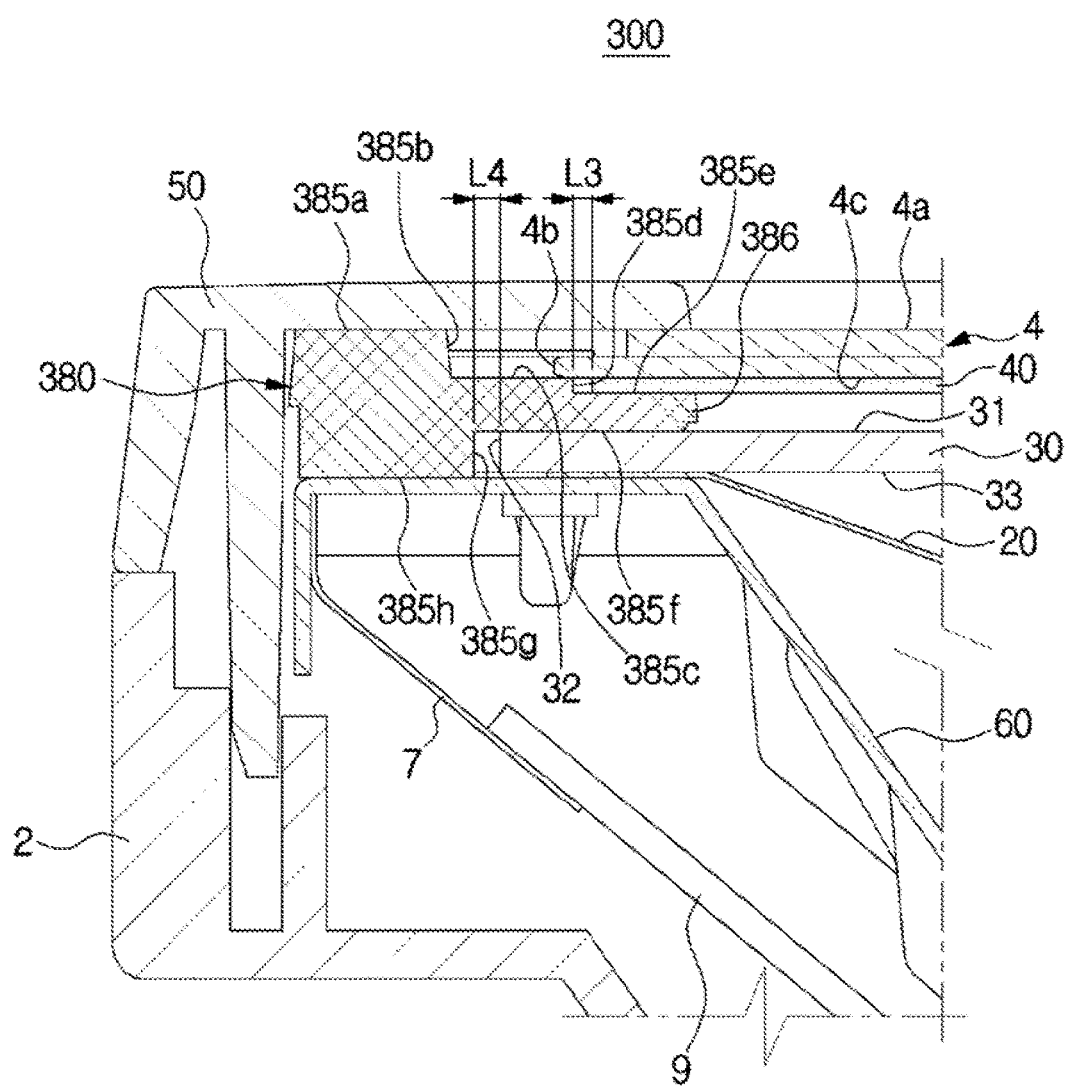
FIG. 14 is a cross-sectional view illustrating a display apparatus 300 according to an exemplary embodiment.

FIG. 14 is a cross-sectional view illustrating a display apparatus 300 according to an exemplary embodiment of the present disclosure.

The same reference numerals are used to describe the same elements as those of the aforementioned exemplary embodiments, and descriptions thereof will not be repeated.

According to the previous exemplary embodiments, the intermediate support part 86 of the frame 80 (FIG. 7) protrudes between the liquid crystal panel 4 and the optical sheet 40 to support the liquid crystal panel 4 and the optical sheet 40 and to space the liquid crystal panel 4 and the optical sheet 40 from each other by a predetermined interval.

According to the exemplary embodiment of FIG. 14, an intermediate support part 386 of a frame 380 protrudes between the optical sheet 40 and the diffuser plate 30 to support the optical sheet 40 and the diffuser plate 30 and to space the optical sheet 40 and the diffuser plate 30 from each other by a predetermined interval.

The frame 380 may have a first support surface 385a, a second support surface 385b, a third support surface 385c, a fourth support surface 385d, a fifth support surface 385e, a sixth support surface 385f, a seventh support surface 385g, and an eighth support surface 385h.

The first support surface 385a may support the rear surface of the bezel part 52 of the top chassis 50.

The second support surface 385b may support the side surface 4b of the liquid crystal panel 4. The second support surface 385b and the side surface 4b of the liquid crystal panel 4 may be spaced apart from each other by a predetermined interval.

The third support surface 385c may support the rear surface 4c of the liquid crystal panel 4. The third support surface 385c may have a flat surface without having protrusions and grooves to stably support the liquid crystal panel 4.

The fourth support surface 385d may support a side surface of the optical sheet 40. The fourth support surface 385d may be spaced apart from the side surface of the optical sheet 40 by a predetermined interval L3 in consideration of thermal expansion of the optical sheet 40.

The fifth support surface 385e may support the rear surface of the optical sheet 40. The fifth support surface 385e may be formed on the intermediate support part 386 of the frame 380.

The sixth support surface 385f may support the front surface 31 of the diffuser plate 30.

The seventh support surface 385g may support side surfaces of the diffuser plate 30 and the reflector plate 20. The seventh support surface 385g may be spaced apart from the side surface of the diffuser plate 30 by a predetermined interval L4 in consideration of thermal expansion of the diffuser plate 30.

The eighth support surface 385h may support the bottom chassis 60.

Through this configuration, the optical sheet 40 may be spaced apart from the diffuser plate 30, and thus rubbing/grinding and scraping caused by friction between the optical sheet 40 and the diffuser plate 30 may be prevented.

In addition, the frame 380 may be designed such that the intervals L3 and L4 from the frame 380 may be appropriately determined in consideration of a difference of thermal expansion between the optical sheet 40 and the diffuser plate 30.

Figure 15:
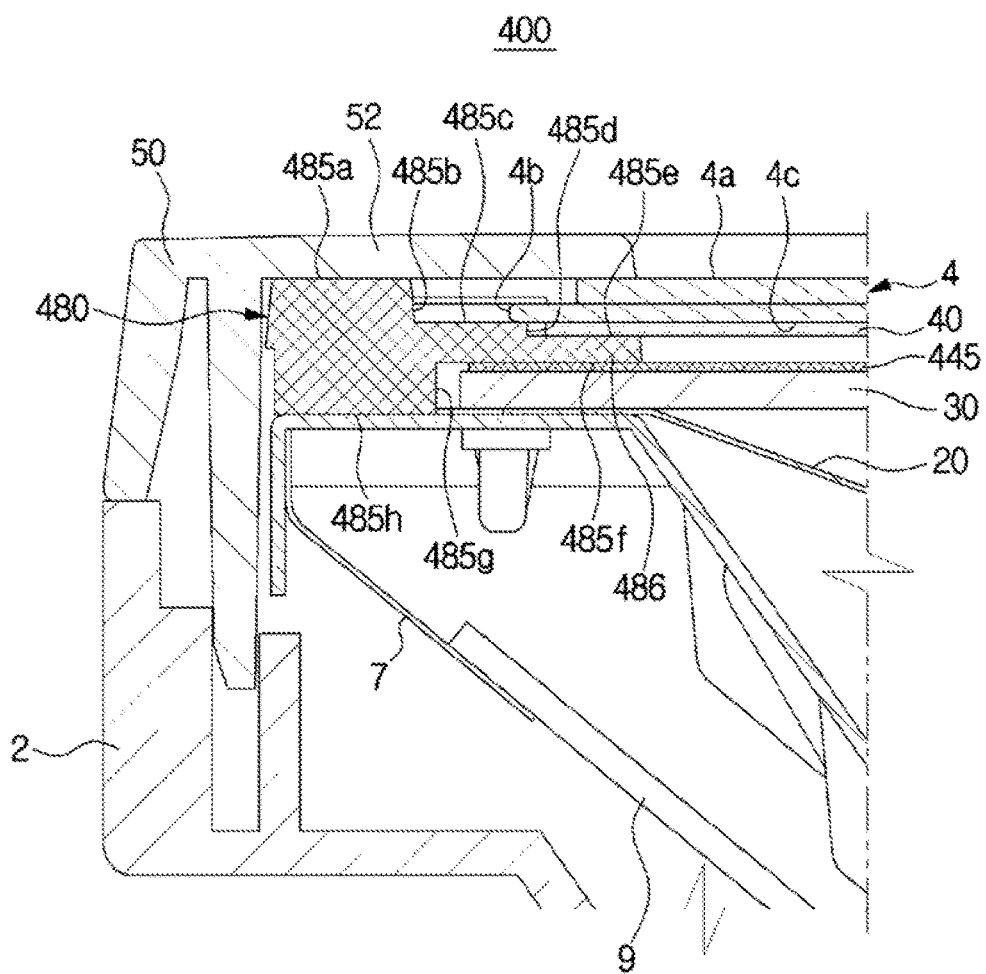
FIG. 15 is a cross-sectional view illustrating a display apparatus 400 according to an exemplary embodiment.

FIG. 15 is a cross-sectional view illustrating a display apparatus 400 according to an exemplary embodiment of the present disclosure.

The same reference numerals are used to describe the same elements as those of the aforementioned exemplary embodiments, and descriptions thereof will not be repeated.

The display apparatus 400 may include a quantum dot sheet 445 to improve color reproduction capability by changing wavelength of light.

Color gamut is an indicator of color reproduction capability of a device and is represented as an area in color coordinates.

Quantum dots, which are nanoscale semiconductor crystals emitting light, may be dispersed in the quantum dot sheet 445. The quantum dots may receive blue light and generate all colors of visible light in accordance with sizes thereof. As the size of the quantum dot decreases, light having a shorter wavelength is emitted. On the other hand, as the size of the quantum dot increases, light having a longer wavelength is emitted.

The quantum dot sheet 445 may be disposed in front of the diffuser plate 30. The quantum dot sheet 445 may be spaced apart from the optical sheet 40 by a predetermined interval.

To this end, an intermediate support part 486 of a frame 480 protrudes between the optical sheet 40 and the quantum dot sheet 445 to support the optical sheet 40 and the quantum dot sheet 445 and to space the optical sheet 40 and the quantum dot sheet 445 from each other.

The frame 480 may have a first support surface 485*a*, a second support surface 485*b*, a third support surface 485*c*, a fourth support surface 485*d*, a fifth support surface 485*e*, a sixth support surface 485*f*, a seventh support surface 485*g*, and an eighth support surface 485*h*.

The first support surface 485*a* may support the rear surface of the bezel part 52 of the top chassis 50.

The second support surface 485*b* may support the side surface 4*b* of the liquid crystal panel 4. The second support surface 485*b* may be spaced apart from the side surface 4*b* of the liquid crystal panel 4 by a predetermined interval.

The third support surface 485*c* may support the rear surface 4*c* of the liquid crystal panel 4. The third support surface 485*c* have a flat surface without having protrusions and grooves to stably support the liquid crystal panel 4.

The fourth support surface 485*d* may support a side surface of the optical sheet 40. The fourth support surface 485*d* may be spaced apart from the side surface of the optical sheet 40 by a predetermined interval in consideration of thermal expansion of the optical sheet 40.

The fifth support surface 485*e* may support the rear surface of the optical sheet 40. The fifth support surface 485*e* may be formed on the intermediate support part 486 of the frame 480.

The sixth support surface 485*f* may support the front surface of the quantum dot sheet 445.

The seventh support surface 485*g* may support side surfaces of the quantum dot sheet 445, the diffuser plate 30, and the reflector plate 20. The seventh support surface 485*g* may be spaced apart from the side surfaces of the quantum dot sheet 445 and the diffuser plate 30 by predetermined intervals in consideration of thermal expansion of the quantum dot sheet 445 and the diffuser plate 30.

The eighth support surface 485*h* may support the bottom chassis 60.

Through this configuration, the display apparatus 400 may have improved color reproduction capability by employing the quantum dot sheet 445 and rubbing/grinding and scraping caused by friction between the optical sheet 40 and the quantum dot sheet 445 may be prevented therein.

In addition, the frame 480 may be designed such that the intervals between the frame 480 and each of the optical sheet 40, the diffuser plate 30, and the quantum dot sheet 445 are appropriately determined in consideration of thermal expansion differences among the optical sheet 40, the diffuser plate 30, and the quantum dot sheet 445.

Figure 16:
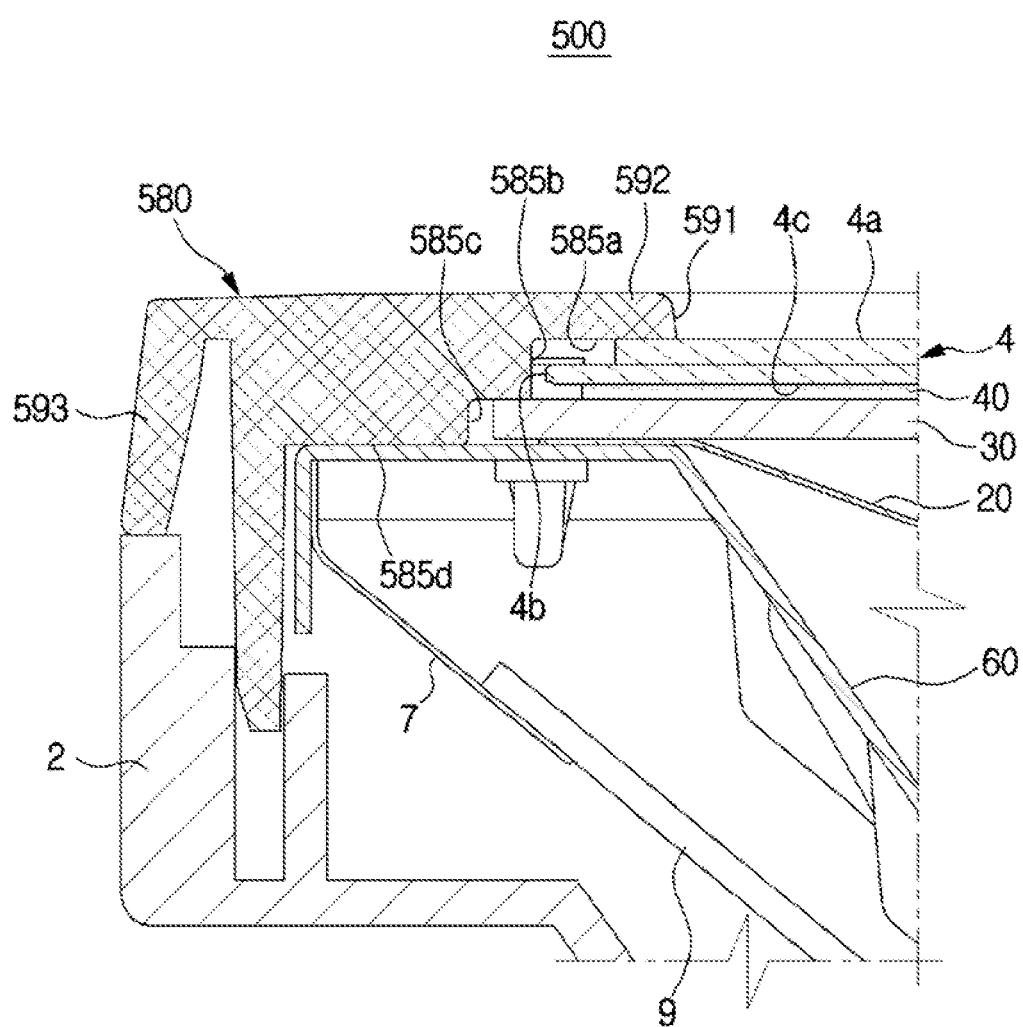
FIG. 16 is a cross-sectional view illustrating a display apparatus 500 according to an exemplary embodiment.

FIG. 16 is a cross-sectional view illustrating a display apparatus 500 according to an exemplary embodiment of the present disclosure.

The same reference numerals are used to describe the same elements as those of the aforementioned exemplary embodiments, and descriptions thereof will not be repeated.

The aforementioned top chassis 50 may not be separately formed and integrally formed with a frame 580.

The frame 580 may include an opening 591 to expose the liquid crystal panel 4 forward, a bezel part 592 to support edges of the front surface of the liquid crystal panel 4, and a side part 593 extending backward from the bezel part 592.

The frame 580 may have a first support surface 585*a*, a second support surface 585*b*, a third support surface 585*c*, and a fourth support surface 585*d*.

The first support surface 585*a* may support the front surface 4*a* of the liquid crystal panel 4.

The second support surface 585*b* may support the side surface 4*b* of the liquid crystal panel 4 and the side surface of the optical sheet 40.

The third support surface 585*c* may support side surfaces of the diffuser plate 30 and the reflector plate 20.

The fourth support surface 585*d* may support the bottom chassis 60.

Through this configuration, the number of parts of the display apparatus 500 may be reduced, a structure thereof may be simplified, and an assembling process may be facilitated.

Figure 17:
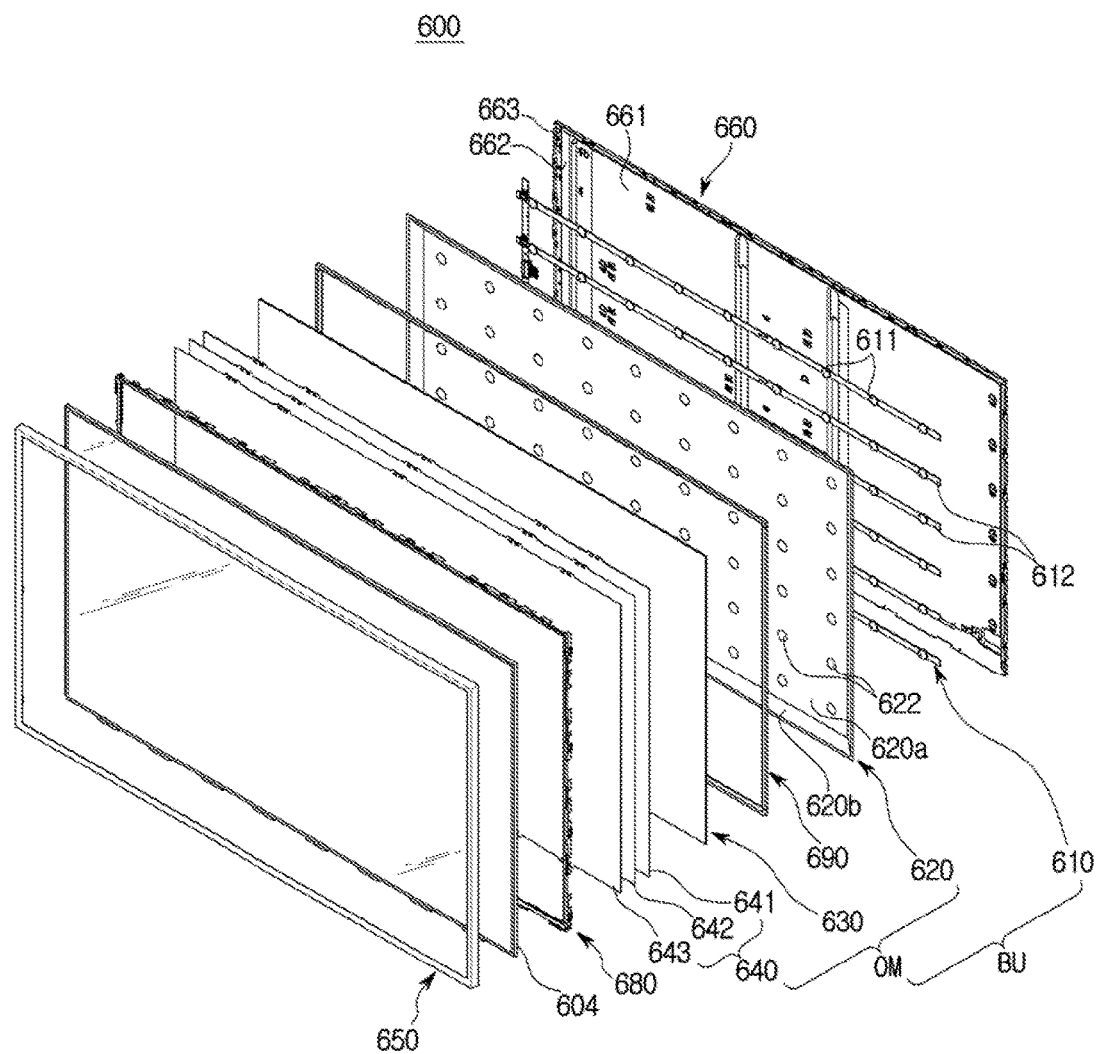
FIG. 17 is an exploded perspective view illustrating a display apparatus 600 according to an exemplary embodiment including a middle holder 690.
Figure 18:
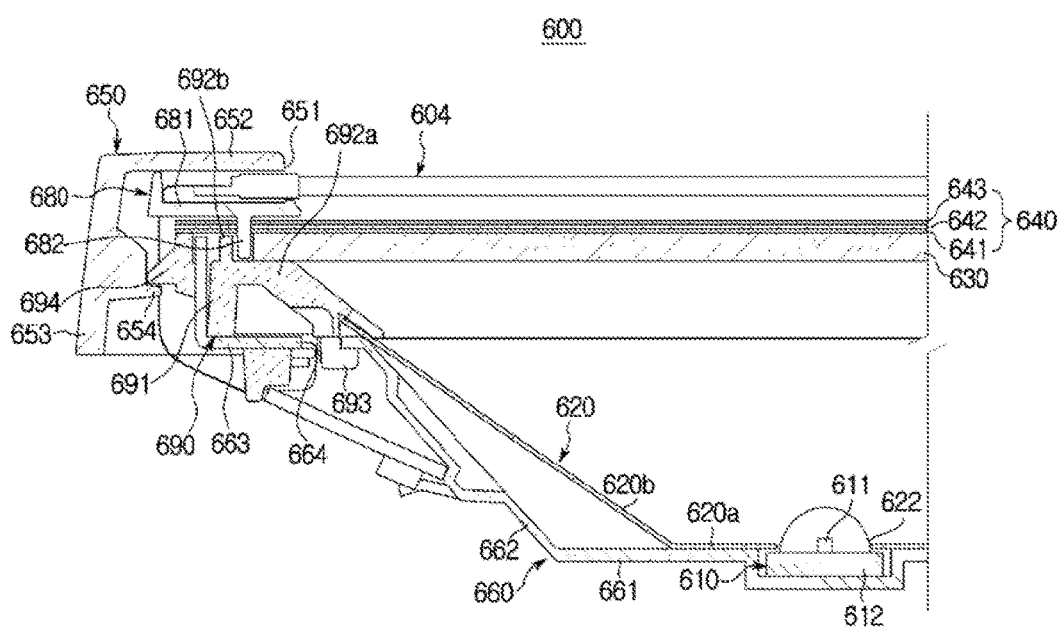
FIG. 18 is a cross-sectional view illustrating the display apparatus 600 of FIG. 17.

FIG. 17 is an exploded perspective view illustrating a display apparatus 600 according to an exemplary embodiment of the present disclosure including a middle holder 690. FIG. 18 is a cross-sectional view illustrating the display apparatus 600 of FIG. 17.

The same reference numerals are used to describe the same elements as those of the aforementioned exemplary embodiments, and descriptions thereof will not be repeated.

The display apparatus 600 may include a middle holder 690 to support a reflector plate 620, a diffuser plate 630, and an optical sheet 640 and reflect light emitted from a light source 611 toward the diffuser plate 630. The middle holder 690 will be described later in more detail.

The display apparatus 600 includes a liquid crystal panel 604 to display an image, a backlight unit BU including a light source module 610 and an optical member OM, a bottom chassis 660 disposed behind the backlight unit BU, and a frame 680 to support the liquid crystal panel 604 and the optical member OM of the backlight unit BU.

The backlight unit BU includes the light source module 610 to emit light and the optical member OM arranged in a path of light emitted from the light source 611.

The light source module 610 includes a substrate 612 and the light source 611 mounted on the substrate 612. The light source 611 includes an LED package in which LED chips are coated with a transparent resin. A plurality of light sources 611 may be mounted on the substrate 612 in a line or in various forms. Alternatively, one light source 611 may be mounted on the substrate 612.

The optical member OM may be arranged in a path of light emitted from the light source 611 to guide a proceeding direction of light, reflect light, scatter light, or improve optical characteristics of light.

The optical member OM includes a reflector plate 620 to prevent light loss by reflecting light, a diffuser plate 630 to uniformly diffuse light non-uniformly emitted from the light source 11, and an optical sheet 640 to improve optical characteristics of light.

The reflector plate 620 includes a reflector plate rear part 620a and a reflector plate side part 620b orthogonally extending from the reflector plate rear part 620a forward to be inclined. The reflector plate rear part 620a may have a through-hole 622 through which the light source 611 penetrates.

The optical sheet 640 may be disposed in front of the diffuser plate 630 to improve optical characteristics of light emitted from the diffuser plate 630.

The optical sheet 640 may include a diffuser sheet 641 to offset a pattern of the diffuser plate 630, a prism sheet 642 to concentrate light, and a protection sheet 643 to protect the optical sheet 640 from external impact or foreign substances.

Although the optical sheet 640 includes three sheets of the diffuser sheet, the prism sheet, and the protection sheet as described above, at least one of the three sheets may be dispensed with or one or two composite sheets having composite properties may be used.

The optical sheet 640 may be disposed in front of the diffuser plate 630 to be supported by the diffuser plate 630 and the frame 680.

The bottom chassis 660 may be disposed behind the backlight unit BU. The bottom chassis 660 has a flat panel shape and the bottom chassis 660 may accommodate the liquid crystal panel 604 and the backlight unit BU together with the top chassis 650.

The bottom chassis 660 includes a rear bottom part 661, a bottom side part 662 orthogonally extending forward from the bottom part 661, a holder coupling part 663 disposed at the front of the bottom side part 662 for coupling the top chassis 650, the bottom chassis 660, and the middle holder 690.

The top chassis 650 may include a bezel part 652 to support edges of the front surface of the liquid crystal panel 604, an opening 651 formed in the bezel part 652 to expose the liquid crystal panel 604, and a top chassis side part 653 extending backward from the bezel part 652.

The frame 680 may have an almost rectangular shape with an opening and be disposed between the top chassis 650 and the bottom chassis 660. The frame 680 may support the liquid crystal panel 604 and the optical member OM of the backlight unit BU.

The frame 680 may be formed of a rubber material as described above and be coupled to the bottom chassis 660. Detailed descriptions of the material of the frame, the coupling structure between the frame 680 and the bottom chassis, and the reinforcement member described above may also be applied to the present exemplary embodiment.

The middle holder 690 supports the reflector plate 620, the diffuser plate 630, and the optical sheet 640 and reflects light emitted from the light source 611 toward the diffuser plate 630.

The middle holder 690 may have an almost rectangular shape and be disposed between the frame 680 and the bottom chassis 660.

The middle holder 690 may be coupled to the bottom chassis 660. To this end, the middle holder 690 may include a bottom coupling part 691 coupled to the holder coupling part 663 of the bottom chassis 660. The bottom coupling part 691 may include a coupling hook 693 protruding backward.

As the coupling hook 693 of the middle holder 690 penetrates a coupling hole 664 of the bottom chassis 660 and held thereby, the middle holder 690 may be coupled to the bottom chassis 660.

The top chassis 650 may be coupled to the middle holder 690. To this end, as the middle holder 690 includes a coupling protrusion 694 protruding toward a side, and a holding protrusion 654 of the top chassis 650 is held by the coupling protrusion 694 of the bottom chassis 650, the top chassis 650 may be coupled to the middle holder 690.

The middle holder 690 may include a diffuser plate support part 692a to support the diffuser plate 630. The middle holder 690 may include an optical sheet support part 692b to support the optical sheet 640.

The middle holder 690 may be white in color to reflect light emitted from the light source 611.

Figure 19:
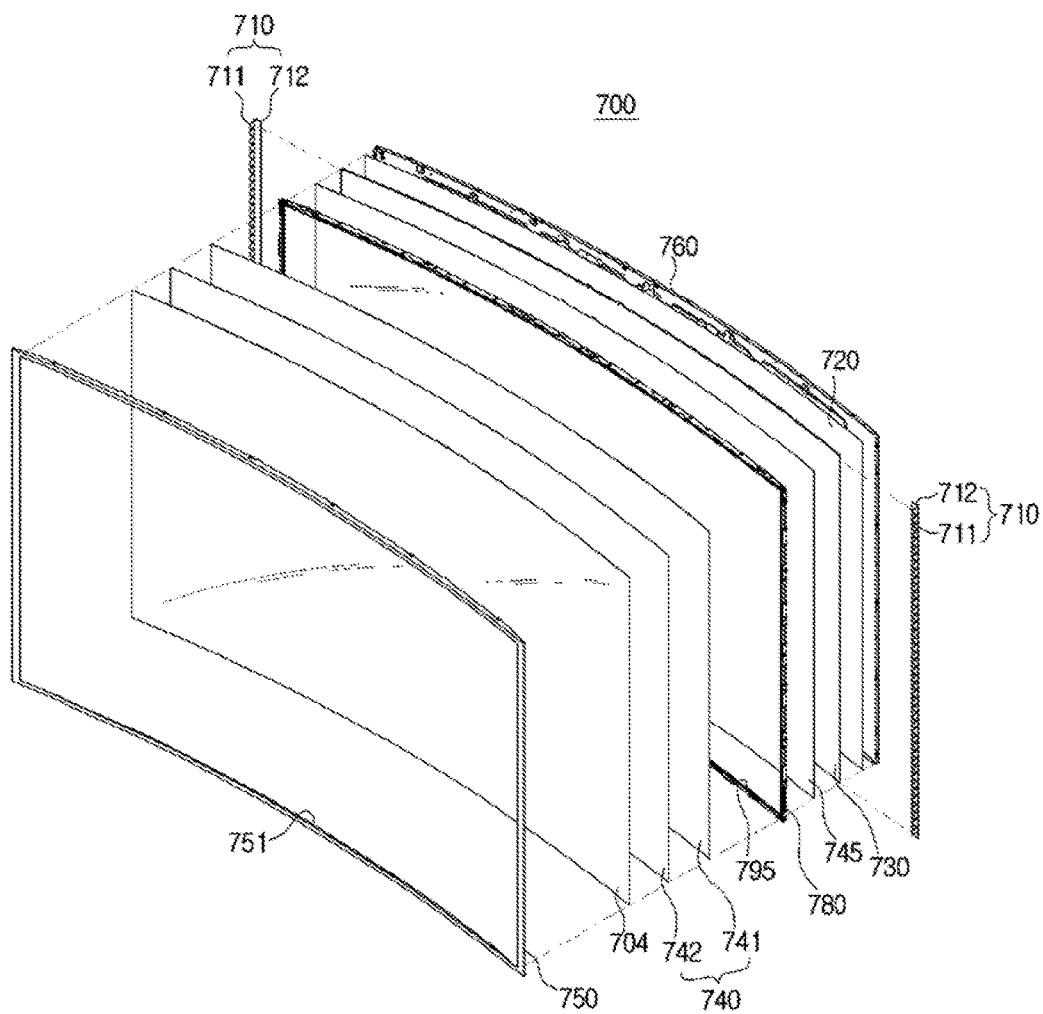
FIG. 19 is an exploded perspective view illustrating a display apparatus 700 according to an exemplary embodiment including an edge type backlight unit.
Figure 20:
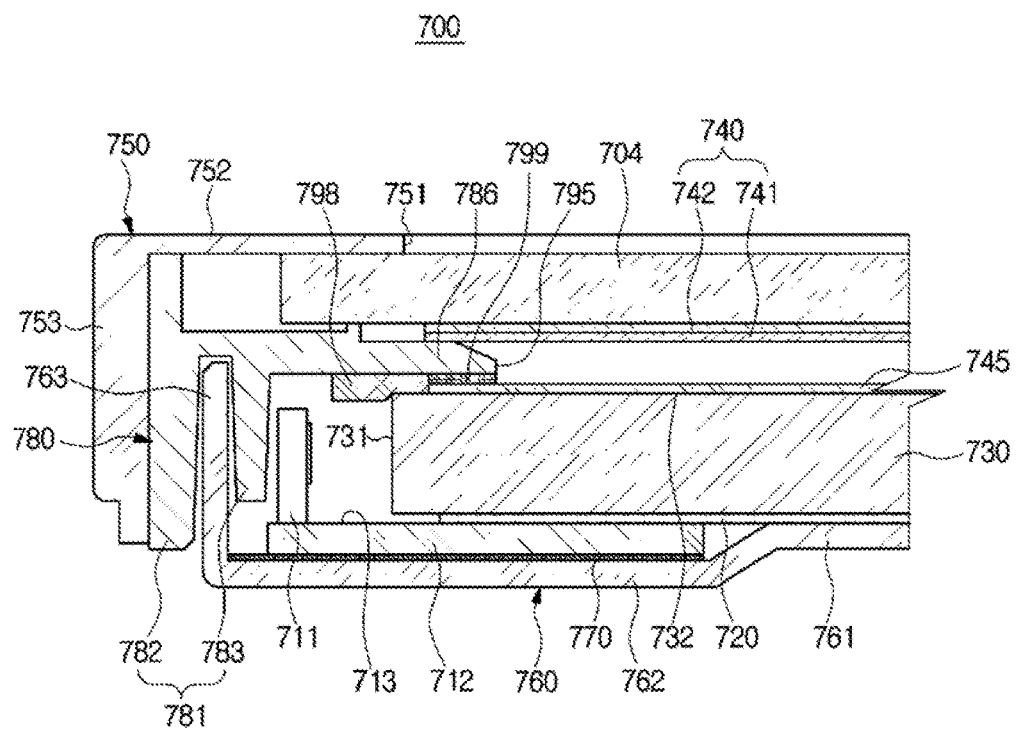
FIG. 20 is a cross-sectional view illustrating the display apparatus 700 of FIG. 20.

FIG. 19 is an exploded perspective view illustrating a display apparatus 700 according to an exemplary embodiment of the present disclosure including an edge type backlight unit. FIG. 20 is a cross-sectional view illustrating the display apparatus 700 of FIG. 20.

A frame 780 according to the present exemplary embodiment may be applied not only to the direct type backlight units described above according to the previous exemplary embodiments but also to an edge type backlight unit. A light source is disposed at a side of a liquid crystal panel in the edge type backlight unit, and the edge type backlight unit includes a light guide plate to guide light emitted from the light source toward the liquid crystal panel.

The display apparatus 700 includes a liquid crystal panel 704 to display an image and a backlight unit BU to supply light to the liquid crystal panel 704.

The backlight unit BU includes a light source module 710 to emit light, a light guide plate 730 to convert light emitted from the light source module 710 into light of a surface light source, a reflector sheet 720 disposed behind the light guide plate 730 and reflecting light from the light guide plate 730 into the light guide plate 730, and an optical sheet 740 to enhance optical characteristics of light such as brightness, uniformity, and directivity. In addition, a quantum dot sheet 745 that improves color reproduction capability by changing the wavelength of light may be disposed between the light guide plate 730 and the optical sheet 740.

The light source module 710 may include a light source 711 and a substrate 712 on which the light source 711 is mounted. The light source 711 may be vertically mounted on a mounting surface 713 of the substrate 712 and may be arranged in parallel to a light emitting surface 732 of the light guide plate 730. Differently from the present exemplary embodiment, the mounting surface 713 of the substrate 712 may be arranged in parallel to an incident surface 731 of the light guide plate 730.

The light guide plate 730 converts light of a line light source or a dot light source into light of a surface light source and guides the light toward the liquid crystal panel 704. The light guide plate 730 may be formed of poly methyl methacrylate acrylate (PMMA).

The light guide plate 730 may have a pattern to change a path of light. In the related art, the pattern is formed on the rear surface of the light guide plate 730, light incident upon the light guide plate 730 is scattered by the rear surface of the light guide plate 730 and emitted forward via a light emitting surface 732.

The light guide plate 730 may be spaced apart from the light source 711 by a predetermined interval in consideration of thermal expansion.

The reflector sheet 720 may be disposed behind the light guide plate 730 to reflect light emitted backward from the light guide plate 730 into the light guide plate 730. The reflector sheet 720 may be integrally formed with the light guide plate 730.

The optical sheet 740 may be disposed in front of the light guide plate 730 to improve optical characteristics of light emitted from the light guide plate 730. The optical sheet 740 may include a diffuser sheet 741 to offset the pattern of the light guide plate 730 and a DBEF sheet 742 that is a high brightness prism sheet. However, the optical sheet 740 may include one optical sheet or at least three optical sheets.

The display apparatus 700 may include a top chassis 750, a bottom chassis 760, and a frame 780 to protect and support the liquid crystal panel 704 and the backlight unit BU.

The top chassis 750 may have an opening 751 to expose the liquid crystal panel 704, a bezel part 752 to support edges of the front surface of the liquid crystal panel 704 and constitute a bezel, and a top side surface part 753 extending backward from the bezel part 752.

The bottom chassis 760 may be disposed behind the backlight unit BU. The bottom chassis 760 may include a base part 761, a substrate accommodating part 762 protruding backward from the base part 761 to accommodate the substrate 712 of the light source module 710, and a bottom side surface part 763 orthogonally extending forward from the base part 761.

A heat dissipate sheet 770 that efficiently transfer heat generated by the light source 711 to the bottom chassis 760 is disposed between the bottom chassis 760 and the substrate 712 of the light source module 710.

The heat dissipate sheet 770 may be disposed behind the substrate 712 of the light source module 710 and formed of graphite.

The frame 780 may have an opening 759 through which light passes from the light guide plate 730 toward the liquid crystal panel 704, an outer frame part 781, and an intermediate support part 786 protruding inward from the outer frame part 781 to space the quantum dot sheet 745 and the optical sheet 740 apart from each other.

The outer frame part 781 may include an outer coupling part 782 and an inner coupling part 783 to be coupled to the bottom chassis 760. As the bottom side surface par 763 of the bottom chassis 760 is inserted between the outer coupling part 782 and the inner coupling part 783, the frame 780 may be coupled to the bottom chassis 760.

The frame 780 may also be formed of a rubber material as described above according to the previous exemplary embodiments and may be coupled to the bottom chassis 760. Detailed descriptions of the material of the frame, the coupling structure with the bottom chassis, and the reinforcement member described above may also be applied to the present exemplary embodiment.

The display apparatus 700 may include a complementary member 798 and a fluorescent member 799 to prevent or minimize a leakage of light emitted from the light source 711 between the light guide plate 730 and the intermediate support part 786 of the frame 780.

As is apparent from the above description, because the rubber tape adhered to the middle frame to prevent movement of the liquid crystal panel is not required, the number of parts may decrease, manufacturing costs may be reduced, and an assembling process may be simplified.

Because the middle frame is coupled to the chassis by fitting, coupling and decoupling thereof may be efficiently performed.

Because dust generation caused by friction between components is minimized, reliability of the display apparatus may be enhanced.

Although exemplary embodiments have been particularly shown and described above, it would be appreciated by those skilled in the art that changes may be made therein without departing from the principles and spirit of the inventive concept, the scope of which is defined in the following claims.

What is claimed is:

1. A display apparatus comprising:
   a liquid crystal panel configured to display an image;
   a backlight unit comprising:
      a light source; and
      an optical member disposed at a path of light emitted from the light source toward the liquid crystal panel;
   a chassis disposed on the backlight unit and having a plurality of insertion holes along edges thereof;
   a frame configured to support the liquid crystal panel and the optical member, the optical member provided between the frame and the chassis; and
   a plurality of reinforcement members configured to support the frame,
   wherein:
   the frame is formed of a thermoplastic rubber material,
   the frame is coupled to the plurality of insertion holes of the chassis by fitting,
   the frame has a rectangular shape defined by a pair of first side frame portions and a pair of second side frame portions, a length of the pair of first side frame portions being greater than a length of the pair of second side frame portions, and
   the plurality of reinforcement members are disposed at corners of the frame to be spaced apart from each other.

2. The display apparatus according to claim 1, wherein the chassis further comprises a bush part protruding backward from edges of the chassis, the bush part forming the plurality of insertion holes.

3. The display apparatus according to claim 1, wherein the frame comprises an insertion protrusion part protruding from the frame to be coupled to an insertion hole amongst the plurality of insertion holes of the chassis.

4. The display apparatus according to claim 3, wherein the insertion protrusion part comprises an insertion body part, a dimension of the insertion body part being greater than a corresponding dimension of the insertion hole.

5. The display apparatus according to claim 4, wherein the insertion protrusion part comprises a guide part having a tapered shape to guide the insertion body part into the insertion hole.

6. The display apparatus according to claim 1 further comprising:
   a rear cover coupled to the chassis; and
   a circuit board disposed between the chassis and the rear cover and configured to control driving of the display apparatus.

7. A display apparatus comprising:
a liquid crystal panel configured to display an image;
a backlight unit comprising:
    a light source; and
    an optical member disposed at a path of light emitted from the light source;
a chassis configured to accommodate the backlight unit;
a frame having a rectangular shape and supporting the liquid crystal panel and the optical member, the frame being formed of a thermoplastic rubber material; and
a plurality of reinforcement members, the plurality of reinforcement members being disposed at corners of the frame to be spaced apart from each other, the plurality of reinforcement members configured to support at least one portion of the frame supporting the liquid crystal panel and the optical member.

8. The display apparatus according to claim 7, wherein the plurality of reinforcement members are coupled to the chassis, the chassis provided between a rear cover and the backlight unit.

9. The display apparatus according to claim 8, wherein the chassis comprises a locking hole provided at an edge of the chassis to be coupled to a reinforcement member amongst the plurality of reinforcement members.

10. The display apparatus according to claim 9, wherein the reinforcement member comprises a hook protrusion part protruding toward the rear cover to be coupled to the locking hole of the chassis by a hook connection.

11. The display apparatus according to claim 7, wherein the plurality of reinforcement members comprises:
    a central part; and
    a plurality of arm parts extending from the central part to be substantially perpendicular to each other.

12. The display apparatus according to claim 7, wherein the frame comprises:
    first side frames; and
    second side frames, and
    wherein the first and the second side frames are coupled to a reinforcement member amongst the plurality of reinforcement members.

13. The display apparatus according to claim 12, wherein a central part of the reinforcement member comprises a connection protrusion to be coupled to one of the first side frames and one of the second side frames.

14. The display apparatus according to claim 7, wherein each of the plurality of reinforcement members comprises a liquid crystal panel reinforcement support surface configured to support a side surface of the liquid crystal panel.

15. The display apparatus according to claim 14, wherein an interval between the liquid crystal panel reinforcement support surface of the reinforcement member and the side surface of the liquid crystal panel is less than an interval between a liquid crystal panel support surface of the frame and the side surface of the liquid crystal panel.

16. A display apparatus comprising:
a liquid crystal panel configured to display an image;
a backlight unit comprising:
    a light source; and
    an optical member, the liquid crystal panel provided on a first surface of the backlight unit;
a chassis provided on a second surface opposite to the first surface of the backlight unit and having a plurality of insertion holes along edges thereof;
a frame provided on the backlight unit, the liquid crystal panel and the optical member provided between the frame and the chassis; and
a plurality of reinforcement members configured to support corner portions of the liquid crystal panel,
wherein:
the frame is formed of a thermoplastic rubber material,
one of the frame and the chassis comprises a male part and the other of the frame and the chassis comprises a female part,
the frame and the chassis are coupled to each other via the male part and the female part,
the frame has a rectangular shape defined by a pair of first side frame portions and a pair of second side frame portions, a length of the pair of first side frame portions being greater than a length of the pair of second side frame portions, and
the plurality of reinforcement member are disposed at corners of the frame to be spaced apart, from each other.

* * * * *